US012228255B2

(12) United States Patent
Cao et al.

(10) Patent No.: US 12,228,255 B2
(45) Date of Patent: *Feb. 18, 2025

(54) LIGHTING DEVICE

(71) Applicant: Nanjing Chervon Industry Co., Ltd., Nanjing (CN)

(72) Inventors: Yafei Cao, Nanjing (CN); Yuexiang Zhang, Nanjing (CN); Rui Zhan, Nanjing (CN); Di Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,933

(22) Filed: Jan. 11, 2024

(65) Prior Publication Data

US 2024/0142070 A1 May 2, 2024

Related U.S. Application Data

(63) Continuation of application No. 17/668,619, filed on Feb. 10, 2022, now Pat. No. 11,913,612.

(30) Foreign Application Priority Data

Feb. 24, 2021 (CN) ......................... 202110206267.6
Dec. 24, 2021 (CN) ......................... 202111601546.9
(Continued)

(51) Int. Cl.
*F21L 4/04* (2006.01)
*F21L 4/02* (2006.01)
(Continued)

(52) U.S. Cl.
CPC .................. *F21L 4/04* (2013.01); *F21L 4/02* (2013.01); *F21V 21/28* (2013.01); *F21V 21/406* (2013.01);
(Continued)

(58) Field of Classification Search
CPC ........ F21V 21/14; F21V 21/145; F21V 21/26; F21V 21/28; F21V 21/29; F21V 21/30;
(Continued)

(56) References Cited

U.S. PATENT DOCUMENTS 4,274,128 A 6/1981 Malis
11,913,612 B2 * 2/2024 Cao ......................... F21V 23/00
(Continued)

FOREIGN PATENT DOCUMENTS

CN 204611390 U * 9/2015
CN 205174036 U 4/2016
(Continued)

OTHER PUBLICATIONS

Machine translation of WO 2020258017 A1 retrieved from the FIT database of PE2E search. (Year: 2024).*
(Continued)

*Primary Examiner* — Colin J Cattanach
(74) *Attorney, Agent, or Firm* — Greenberg Traurig, LLP

(57) ABSTRACT

A lighting device includes a base, a panel assembly, and a power supply assembly. The panel assembly is at least partially connected to the base and includes a luminous body. The power supply assembly is connected to the lighting device. The panel assembly includes a main panel and a plurality of auxiliary panels. The main panel is fixedly connected to the base, a first auxiliary panel among the plurality of auxiliary panels is rotatably connected to the main panel, and a second auxiliary panel among the plurality of auxiliary panels is rotatably connected to the first auxiliary panel.

20 Claims, 21 Drawing Sheets

(30) Foreign Application Priority Data

| | | |
|---|---|---|
| Dec. 24, 2021 | (CN) | 202111601549.2 |
| Dec. 24, 2021 | (CN) | 202111603360.7 |

(51) Int. Cl.

| | |
|---|---|
| ***F21V 21/14*** | (2006.01) |
| ***F21V 21/26*** | (2006.01) |
| ***F21V 21/28*** | (2006.01) |
| ***F21V 21/29*** | (2006.01) |
| ***F21V 21/30*** | (2006.01) |
| ***F21V 21/40*** | (2006.01) |
| ***F21V 23/02*** | (2006.01) |
| ***F21V 29/74*** | (2015.01) |
| ***F21Y 105/16*** | (2016.01) |
| ***F21Y 107/50*** | (2016.01) |

(52) U.S. Cl.
CPC ............ *F21V 23/023* (2013.01); *F21V 29/74* (2015.01); *F21L 4/045* (2013.01); *F21V 21/14* (2013.01); *F21V 21/145* (2013.01); *F21V 21/26* (2013.01); *F21V 21/29* (2013.01); *F21V 21/30* (2013.01); *F21V 21/40* (2013.01); *F21Y 2105/16* (2016.08); *F21Y 2107/50* (2016.08)

(58) Field of Classification Search
CPC .......... F21V 21/40; F21V 21/406; F21L 4/02; F21L 4/022; F21L 4/025; F21L 4/027; F21L 4/04; F21L 4/045
See application file for complete search history.

(56) References Cited

U.S. PATENT DOCUMENTS

| | | | | |
|---|---|---|---|---|
| 2008/0174991 | A1 | 7/2008 | Tucker | |
| 2013/0271993 | A1 | 10/2013 | Jan | |
| 2014/0268775 | A1 | 9/2014 | Kennemer | |
| 2018/0340661 | A1 * | 11/2018 | Inskeep | F21V 21/30 |
| 2019/0285257 | A1 | 9/2019 | Gall | |
| 2020/0284425 | A1 | 9/2020 | Plato | |
| 2021/0054982 | A1 | 2/2021 | Moran | |
| 2021/0140620 | A1 | 5/2021 | Tsuge | |

FOREIGN PATENT DOCUMENTS

| | | | |
|---|---|---|---|
| CN | 110375216 | A | 10/2019 |
| WO | 2016151442 | A1 | 9/2016 |
| WO | 2017063302 | A1 | 4/2017 |
| WO | 2018177274 | A1 | 10/2018 |
| WO | WO-2020258017 | A1 * | 12/2020 |

OTHER PUBLICATIONS

Machine translation of CN 204611390 U retrieved from the FIT database of PE2E search. (Year: 2024).*

Extended European search report issued on European patent application No. 22156231.7, dated Jul. 15, 2022, 8 pages.

Machine translation of WO 2018177274 A1 retrieved from the FIT database of PE2E search. (Year: 2023).

Machine Translation of WO 2017063302 A1 Retrieved from FIT Database. (Year: 2022).

* cited by examiner

LIGHTING DEVICE

RELATED APPLICATION INFORMATION

This application is a continuation of U.S. application Ser. No. 17/668,619, filed on Feb. 10, 2022, which application claims the benefit under 35 U.S.C. § 119(a) of Chinese Patent Application No. CN 202110206267.6, filed on Feb. 24, 2021, Chinese Patent Application No. CN 202111601549.2, filed on Dec. 24, 2021, Chinese Patent Application No. CN 202111603360.7, filed on Dec. 24, 2021, and Chinese Patent Application No. CN 202111601546.9, filed on Dec. 24, 2021, which applications are incorporated herein by reference in their entirety.

BACKGROUND

A lighting device is a lighting tool. With the rapid development of technology, increasingly high requirements are put on the brightness of the lighting device in various fields. With increasingly high requirements on the brightness of a portable lighting device, a problem emerges that the endurance of the lighting device becomes shorter and shorter. Moreover, the overall weight of a high-power lighting device is relatively large and the operation convenience of the high-power lighting device is relatively low. At present, how to provide a lighting device with long endurance, a wide use range, strong environment adaptiveness, and convenient operation is a technical problem to be solved urgently.

SUMMARY

In some examples, a lighting device includes a base, a panel assembly, and a power supply assembly. The panel assembly is at least partially connected to the base and includes a luminous body. The power supply assembly is connected to the lighting device. The panel assembly includes a main panel, a first auxiliary panel, and a second auxiliary panel. The main panel is fixedly connected to the base, the first auxiliary panel is rotatably connected to the main panel, and the second auxiliary panel is rotatably connected to the first auxiliary panel.

In some examples, the panel assembly further includes a third auxiliary panel, where the third auxiliary panel is rotatably connected to the first auxiliary panel.

In some examples, a power-to-volume ratio of the lighting device is configured to be greater than or equal to 4.8 W/dm$^3$ and less than or equal to 17 W/dm$^3$.

In some examples, the lighting device further includes an unfolded state and a folded state, where in the case where the lighting device is in the folded state, the panel assembly covers at least part of the power supply assembly.

In some examples, a first handle and a second handle are further included, where the first handle is at least partially connected to the first auxiliary panel, and the second handle is at least partially connected to the main panel.

In some examples, in the case where the lighting device is in the unfolded state, the first handle is operable so as to transport the lighting device; and in the case where the lighting device is in the folded state, the second handle is operable so as to transport the lighting device.

In some examples, the base is further provided with a positioning groove, and each of the second auxiliary panel and the third auxiliary panel is further provided with a positioning protrusion; and the lighting device further includes an unfolded state and a folded state, where in the case where the lighting device is in the folded state, the positioning protrusion mates with the positioning groove.

In some examples, a cover plate configured to cover at least part of the power supply assembly is further included, where the lighting device further includes an unfolded state and a folded state, where in the case where the lighting device is in the folded state, the cover plate covers at least part of a power supply device.

In some examples, the panel assembly includes a casing, a light board, and a heat sink, where the casing is formed with an accommodation space, and the light board is disposed in the accommodation space; the heat sink is connected to the light board and configured to transfer heat of the light board; and a heat conducting member is further provided between the heat sink and the casing, where the heat conducting member is capable of transferring heat of the heat sink to the casing from which the heat is dissipated.

In some examples, the casing is further provided with heat dissipation ribs which are distributed around an outer surface of the casing; and a material of the casing includes plastic.

In some examples, the panel assembly has a thickness greater than or equal to 15 mm and less than or equal to 35 mm In some examples, the base is provided with a sliding groove, where the sliding groove connects the lighting device to an external structure; or the sliding groove is capable of connecting the lighting device to an accessory, and the accessory connects the external structure to the sliding groove.

In some examples, a locking damping mechanism is provided between the main panel and the first auxiliary panel, where the locking damping mechanism is capable of providing a first resistance preventing rotation of the first auxiliary panel, and in the case where the first resistance is greater than a preset value, the locking damping mechanism is capable of locking the first auxiliary panel and the main panel.

In some examples, the locking damping mechanism includes an adjustment member configured to adjust a magnitude of the first resistance.

In some examples, the locking damping mechanism is capable of providing a second resistance for the rotation of the first auxiliary panel, where the second resistance is less than the preset value.

In some examples, a lighting device includes a base and a panel assembly. The panel assembly is at least partially connected to the base and includes a luminous body. The panel assembly includes a main panel and a plurality of auxiliary panels. The panel assembly includes a main panel, a first auxiliary panel, and a second auxiliary panel. The main panel is connected to the base, the first auxiliary panel is rotatably connected to the main panel, and the second auxiliary panel is rotatably connected to the first auxiliary panel. A luminous flux of light emitted by the panel assembly at a maximum power is greater than or equal to 6000 lm and less than or equal to 20000 lm.

In some examples, the luminous flux of the light emitted by the panel assembly at the maximum power is greater than or equal to 8000 lm and less than or equal to 20000 lm.

In some examples, the lighting device further includes a power supply assembly configured to store energy, where the power supply assembly is detachably connected to the lighting device.

In some examples, the panel assembly includes a shell that allows light to pass through; in the case where the shell is made of a transparent material, the luminous flux of the light emitted by the panel assembly at the maximum power is greater than or equal to 8000 lm and less than or equal to 20000 lm; and in the case where the shell is made of a translucent material, the luminous flux of the light emitted by the panel assembly at the maximum power is greater than or equal to 6000 lm and less than or equal to 17000 lm.

In some examples, a rated voltage of a power supply assembly is greater than or equal to 40 V.

In some examples, a ratio of the luminous flux of the light emitted by the panel assembly at the maximum power to a volume of the lighting device in a folded state is greater than or equal to 400 $lm/dm^3$ and less than or equal to 2000 $lm/dm^3$.

In some examples, a lighting device includes a base and a panel assembly. The panel assembly is at least partially connected to the base and includes a luminous body. The panel assembly includes a main panel and a plurality of auxiliary panels. The main panel is fixedly connected to the base, where the main panel has a main illumination plane that emits light, the lighting device has a projection plane that receives light, and the projection plane is parallel to the main illumination plane. A first auxiliary panel among the plurality of auxiliary panels is rotatably connected to the main panel, and a second auxiliary panel among the plurality of auxiliary panels is rotatably connected to the first auxiliary panel. The lighting device forms a main illumination region and an auxiliary illumination region, where the main illumination region includes at least light emitted by the main panel; light emitted by the plurality of auxiliary panels is projected on the projection plane so as to form an actual illumination area; in the case where the plurality of auxiliary panels are parallel to the projection plane, the light emitted by the plurality of auxiliary panels is projected on the projection plane so as to form a maximum illumination area; in the case where a ratio of the actual illumination area to the maximum illumination area is less than or equal to 0.5, the plurality of auxiliary panels form the auxiliary illumination region.

DETAILED DESCRIPTION

Figure 1:
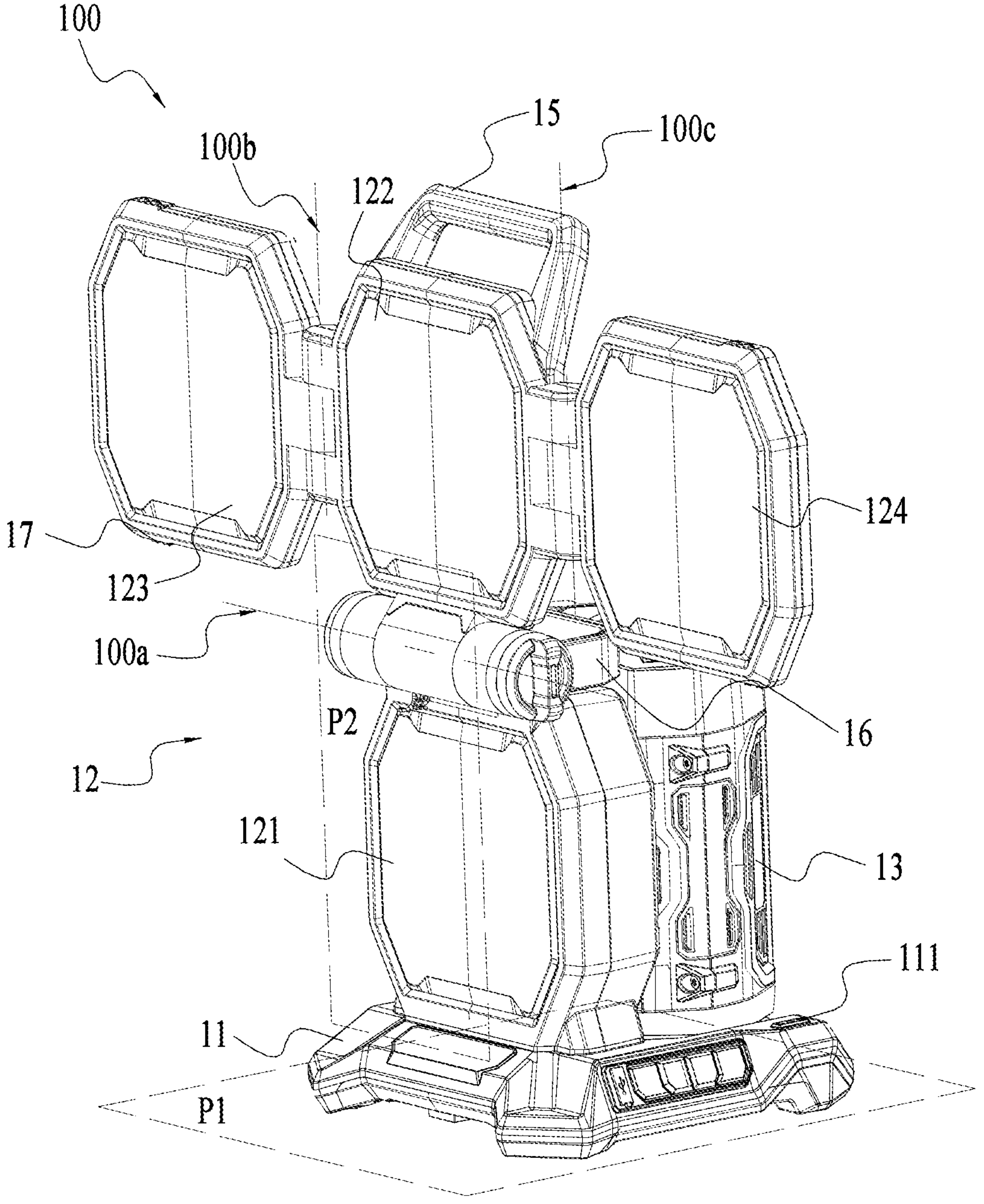
FIG. 1 is a perspective view of a lighting device in an unfolded state.

A lighting device 100 shown in FIG. 1 includes a base 11, a panel assembly 12, and a power supply assembly 13, where the panel assembly 12 and the power supply assembly 13 are both disposed on the base 11. The panel assembly 12 includes a main panel 121 and multiple auxiliary panels, where the multiple auxiliary panels include a first auxiliary panel 122, a second auxiliary panel 123, and a third auxiliary panel 124. The main panel 121 is fixedly connected to the base 11, the first auxiliary panel 122 is rotatably connected to the main panel 121, the second auxiliary panel 123 is rotatably connected to the first auxiliary panel 122, the third auxiliary panel 124 is rotatably connected to the first auxiliary panel 122, and the second auxiliary panel 123 and the third auxiliary panel 124 are respectively disposed on two sides of the first auxiliary panel 122. In the case where the main panel 121, the first auxiliary panel 122, the second auxiliary panel 123, and the third auxiliary panel 124 are all disposed in the same plane, the panel assembly 12 can emit light in the same direction. In the case where the first auxiliary panel 122, the second auxiliary panel 123, and the third auxiliary panel 124 rotate to different positions relative to the main panel 121, the first auxiliary panel 122, the second auxiliary panel 123, and the third auxiliary panel 124 can emit light in their respective planes. Therefore, the lighting device 100 may be configured to emit light in any direction at the same time or may be configured to focus on one direction to emit light. The lighting device 100 further includes a first illumination mode and a second illumination mode. Specifically, in the case where only local lighting is required in an operation environment, the lighting device 100 may be operated to control one panel in the panel assembly 12 to light up. In this example, in the case where the lighting device 100 is in the first illumination mode, the first auxiliary panel 122 lights up, and the main panel 121, the second auxiliary panel 123, and the third auxiliary panel 124 are off. In this case, the first auxiliary panel 122 may also be adjusted to output different lumens. Specifically, according to environmental requirements, the first auxiliary panel 122 may output four lumens. In the case where ambient lighting is required, that is, when an entire region needs to be illuminated, the lighting device 100 may be operated to control all panels to light up, so as to provide omni-directional illumination for the environment in which the lighting device 100 is currently located. In this case, the lighting device 100 is in the second illumination mode, the main panel 121, the first auxiliary panel 122, the second auxiliary panel 123, and the third auxiliary panel 124 all light up, that is, the lighting device 100 can illuminate a region within a 360° range. In the case where the lighting device 100 is in the second illumination mode, the first auxiliary panel 122, the second auxiliary panel 123, and the third auxiliary panel 124 may also be operated to rotate around their respective rotation axes, thereby adjusting the lighting device 100 to be in the best illumination state. The lighting device 100 further has a brightness adjustment device. When the lighting device 100 is in different illumination modes, the panel assembly 12 may be adjusted to output different lumens so that the lighting device 100 emits light of different intensities. In addition, the lighting device 100 further includes a third illumination mode, a fourth illumination mode, and a fifth illumination mode. Specifically, in the case where the lighting device 100 is in the third illumination mode, the first auxiliary panel 122, the second auxiliary panel 123, and the third auxiliary panel 124 light up, and the main panel 121 is off. In this case, the lighting device 100 can illuminate a high and far place. In the case where the lighting device 100 is in the fourth illumination mode, the main panel 121, the first auxiliary panel 122, the second auxiliary panel 123, and the third auxiliary panel 124 all light up, and the panel assembly 12 flashes twice or three times per second, thereby providing an alarm function. In the case where the lighting device 100 is in the fifth illumination mode, the main panel 121, the first auxiliary panel 122, the second auxiliary panel 123, and the third auxiliary panel 124 all light up, and the first auxiliary panel 122, the second auxiliary panel 123, and the third auxiliary panel 124 may each be adjusted to output a maximum lumen. In this case, the lighting device 100 illuminates the environment in a strongest illumination state and can output, at a maximum power, a lumen greater than a lumen in the second illumination mode.

Specifically, in this example, the first auxiliary panel 122 is connected above the main panel, and the second auxiliary panel 123 and the third auxiliary panel 124 are disposed on left and right sides of the first auxiliary panel so that the unfolded lighting device 100 is T-shaped. Further, the first auxiliary panel 122 may also be disposed on a left or right side of the main panel 121, and when folded, the first auxiliary panel 122 overlaps with the main panel 121. Furthermore, more auxiliary panels may be connected to the second auxiliary panel 123 and the third auxiliary panel 124, or the third auxiliary panel 124 may not be provided.

In the case where the panel assembly 12 includes only 2 or 3 auxiliary panels, or only 2 or 3 auxiliary panels of at least three auxiliary panels in the panel assembly 12 light up, a luminous flux of light emitted by the panel assembly 12 at the maximum power is greater than or equal to 6000 lm is less than or equal to 20000 lm. The luminous flux of the light emitted by the panel assembly 12 at the maximum power is greater than or equal to 8000 lm and less than or equal to 20000 lm. Optionally, the luminous flux of the light emitted by the panel assembly 12 at the maximum power is within a range formed by one or more of 9000 lm, 10000 lm, 11000 lm, 12000 lm, 13000 lm, 14000 lm, 15000 lm, 16000 lm, 17000 lm, 18000 lm, and 19000 lm. A luminous flux of light emitted by the main panel 121 or the auxiliary panel at the maximum power is greater than or equal to 2000 lm and less than or equal to 5000 lm. The panel assembly 12 includes a shell for light to pass through. In the case where the shell is made of a transparent material, all of light from a luminous body in the panel assembly 12 basically passes through the shell and is projected to an outside of the lighting device 100. In this case, the luminous flux of the light emitted by the panel assembly 12 at the maximum power is greater than or equal to 8000 lm and less than or equal to 20000 lm. In the case where the shell is made of a translucent material, the luminous flux of the light emitted by the panel assembly at the maximum power is greater than or equal to 6000 lm and less than or equal to 17000 lm. The translucent material here may refer to all materials that cause a loss of a luminous flux of the luminous body or refer to materials that are between a completely transparent material and a completely opaque material. A color temperature of the panel assembly 12 is greater than or equal to 4200 k and less than or equal to 6000 k. A color rendering index of the panel assembly 12 is greater than or equal to 80, and a test result shows that a color rendering index of the lighting device 100 in this example may be greater than 82. Further, a rated voltage of the power supply assembly 13 is greater than or equal to 40 V. Preferably, the rated voltage is greater than or equal to 50 V. The present disclosure further defines an illuminance efficiency coefficient of the lighting device. The illuminance efficiency coefficient is a ratio of the luminous flux of the light emitted by the panel assembly 12 at the maximum power to a volume of the lighting device in a folded state. The illuminance efficiency coefficient is greater than or equal to 400 $lm/dm^3$ and less than or equal to 2000 $lm/dm^3$ and, in particular, may be greater than or equal to 533 $lm/dm^3$ and less than or equal to 2000 $lm/dm^3$.

The power supply assembly 13 includes a battery pack for storing energy, the battery pack includes a battery pack housing and a plurality of cells arranged in the battery pack housing, and the plurality of cells are lithium-ion cells. In some examples, the plurality of cells are pouch-type cells and each of the plurality of cells is a flat bag-like structure.

Figure 2:
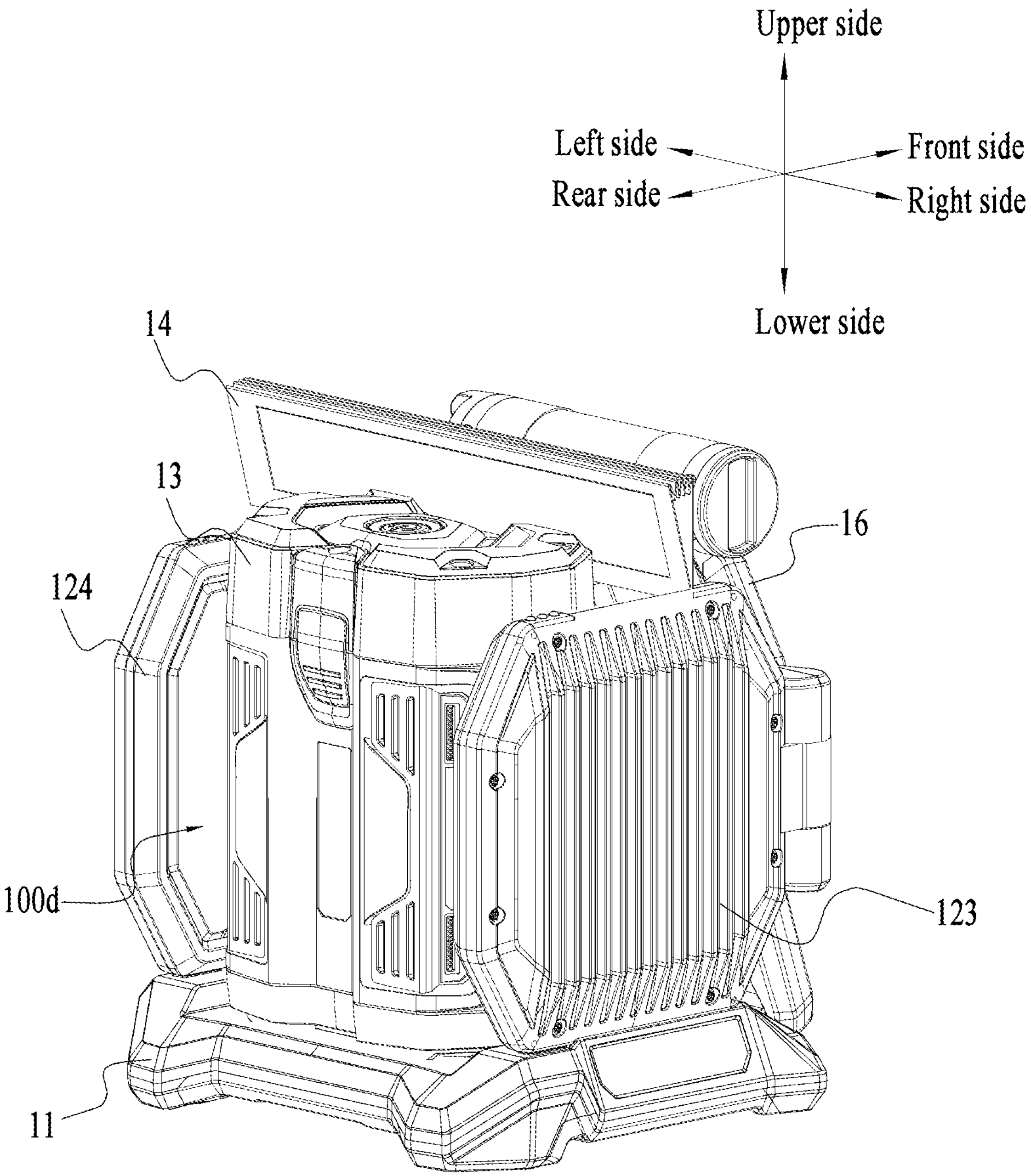
FIG. 2 is a perspective view of the lighting device in FIG. 1 in a folded state.

The lighting device 100 includes an unfolded state shown in FIG. 1 and the folded state shown in FIG. 2. The lighting device 100 is further provided with a cover plate 14 covering at least part of the power supply assembly 13. The cover plate 14 may expand to cover at least part of the power supply assembly 13. To clearly illustrate technical solutions of the present disclosure, a front side, a rear side, a left side, a right side, an upper side, and a lower side shown in FIG. 2 are further defined. When the lighting device 100 is in the folded state shown in FIG. 2, the power supply assembly 13 may be inserted into or detached from the main panel 121 along an up-and-down direction. In fact, the power supply assembly 13 may also be inserted into or detached from the base 11, and a weight of the power supply assembly 13 is directly added to the base 11 so that the base 11 supports other structures more stably. The preceding detachment mechanism may also be disposed on a back of the main panel 121, where the back refers to a side opposite to an illumination region. After the power supply assembly 13 is connected to a casing on the back of the main panel 121, a side of the power supply assembly 13 may be in contact with a surface of the base or a gap exists between the side of the power supply assembly 13 and the surface of the base 11. In this case, the weight of the power supply assembly 13 is added to the main panel 121 so that the main panel is more stable as a main light source. When the power supply assembly 13 is installed on the main panel 121, the lighting device 100 has a first center of gravity, the first auxiliary panel 122, the second auxiliary panel 123, and the third auxiliary panel 124 may rotate to any position, and the lighting device 100 does not overturn. An orthographic projection of the power supply assembly 13 on a plane where the base is located is within the base 11 or basically within the base 11 so that an orthographic projection of the first center of gravity on the plane where the base 11 is located is in a middle of the base. When a power supply device is detached from the main panel 121, the lighting device 100 has a second center of gravity, the first auxiliary panel 122, the second auxiliary panel 123, and the third auxiliary panel 124 may rotate to any position, and the lighting device 100 does not overturn. Along a front-and-rear direction, a distance between the first center of gravity and the second center of gravity is less than or equal to 40 mm.

The base 11 is a bottom base extending substantially along a first plane P1, and the main panel 121 extends substantially along a second plane P2. The first auxiliary panel 122 is rotatably connected to the main panel 121 about a first axis 100*a*, and the first axis 100*a* is substantially parallel to the first plane P1 and is substantially parallel to the second plane P2. The second auxiliary panel 123 is rotatably connected to the first auxiliary panel 122 about a second axis 100*b*, and the second axis 100*b* is substantially perpendicular to the first axis 100*a*. The third auxiliary panel 124 is rotatably connected to the first auxiliary panel 122 about a third axis 100*c*, and the third axis 100*c* is substantially perpendicular to the first axis 100*a* and is substantially parallel to the second axis 100*b*.

When the lighting device 100 is in the folded state shown in FIG. 2, the first auxiliary panel 122 is operated to rotate to the front side of the main panel 121, the power supply assembly 13 is disposed at the rear side of the main panel 121, the main panel 121 is disposed between the main panel 121 and the first auxiliary panel 122, the second auxiliary panel 123 is operated to rotate backward and disposed at right side of the power supply assembly 13, and the third auxiliary panel 124 is operated to rotate backward and disposed at left side of the power supply assembly 13. When the lighting device 100 is in the folded state, the main panel 121, the second auxiliary panel 123, and third auxiliary panel 124 are surrounded to form a U-shaped area 100*d*, and the power supply assembly 13 is arranged at least partially in the U-shaped area 100*d*.

A direction in which the power supply assembly 13 is coupled to the main panel 121 is substantially perpendicular to the first plane P1.

Specifically, a control device is further disposed inside the base 11 and basically disposed on a rear side of the base 11 in the front-and-rear direction so that when the first auxiliary panel 122, the second auxiliary panel 123, and the third auxiliary panel 124 rotate to the foremost side, the lighting device 100 can also maintain stability without overturning. It is to be understood that when the lighting device 100 is in the folded state, the panel assembly 12 at least partially covers the power supply assembly 13 so as to protect the power supply assembly. More specifically, in the case where the lighting device 100 is in the unfolded state, a volume of the lighting device 100 is greater than or equal to 42 $dm^3$ and less than or equal to 67 $dm^3$; and in the case where the lighting device 100 is in the folded state, the volume of the lighting device 100 is greater than or equal to 10 $dm^3$ and less than or equal to 15 $dm^3$. In this example, power of the lighting device 100 is configured to be greater than or equal to 100 W and less than or equal to 200 W. Therefore, a power-to-volume ratio of the lighting device 100 is configured to be greater than or equal to 4.8 $W/dm^3$ and less than or equal to 17 $W/dm^3$. Further, in the case where the power-to-volume ratio of the lighting device 100 is configured to be greater than or equal to 6 $W/dm^3$ and less than or equal to 10 $W/dm^3$, the lighting device 100 has the best transportation, storage, and use states.

The lighting device 100 further includes a first handle 15 and a second handle 16. The first handle 15 is disposed on the first auxiliary panel 122 and the second handle 16 is disposed on the main panel 121. In the case where the lighting device 100 is in the unfolded state, the first handle 15 may be operated so as to transport the lighting device 100. In the case where the lighting device 100 is in the folded state, the second handle 16 may be operated so as to transport the lighting device 100. The first handle 15 and the second handle 16 are provided so that the lighting device 100 can be quickly transported in any state, and no interference exists between the handles and the lighting device 100 during transportation.

In this example, the base 11 is further provided with a positioning groove 111, and each of the second auxiliary panel 123 and the third auxiliary panel 124 is further provided with a positioning protrusion 17. In the case where the lighting device 100 is in the folded state, the positioning protrusion 17 on each of the second auxiliary panel 123 and the third auxiliary panel 124 mates with the positioning groove 111 on the base 11. In this manner, when the lighting device 100 is in the folded state, the lighting device 100 can maintain stability so that the following case is avoided: the second auxiliary panel 123 or the third auxiliary panel 124 is detached from the base when the lighting device 100 shakes. The base 11 is made of a flexible anti-drop material so that the drop resistance of the lighting device 100 can be effectively increased. In addition, the positioning protrusion 17 is made of a rigid material and installed on the second auxiliary panel 123 and the third auxiliary panel 124, so as to effectively ensure the stability of the lighting device 100 in the folded state.

Figure 22:
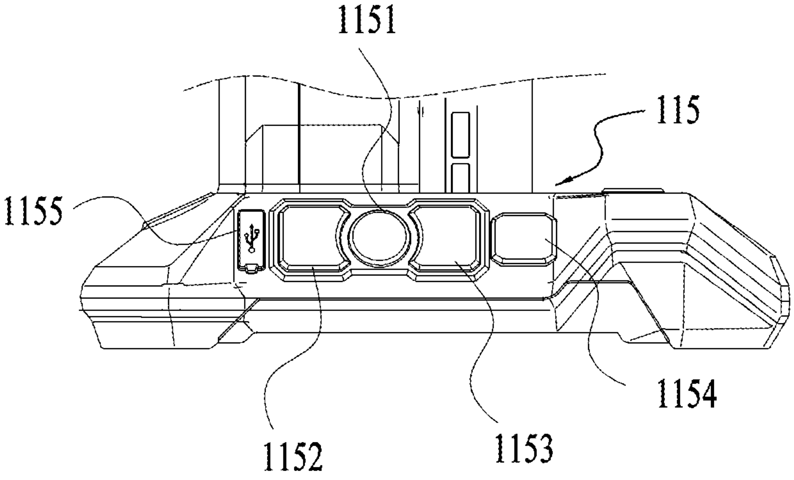
FIG. 22 is a structural view of a button region of a lighting device.

The base 11 is provided with a circuit board and a button circuit board, where the circuit board is disposed in a middle of the base 11, and the button circuit board and a corresponding button region 115 are disposed on a side of the base 11. Related lines connected to the circuit board extend in the casing of the main panel 121, and some lines are connected to the button circuit board. It is conceivable that the button circuit board and the circuit board form a modular connection. As shown in FIG. 22, the button region 115 includes a main button 1151, a first button 1152, a second button 1153, a third button 1154, and a function position 1155. The main button 1151 is configured to turn on and off the lighting device 100. The lighting device 100 is further provided with a wireless module for communicating with an external device. When the main button 1151 is continuously pressed for more than a set time, the wireless module is turned on. Specifically, the main button 1151 is further provided with an indicator light, which can switch light display according to the preceding states such as startup, shutdown, or a connection to the wireless module. The first button 1152 and the second button 1153 are respectively configured to increase and decrease a brightness value of the panel assembly 12. Further, when the first button 1152 or the second button 1153 is continuously pressed for more than a set time, the brightness value of the panel assembly 12 directly jumps to a lowest or highest brightness of the panel assembly 12. The third button 1154 is operated so as to switch the on and off of the main panel and the multiple auxiliary panels. Further, when the third button 1154 is continuously pressed for more than a set time, the panel assembly 12 enters the fourth illumination mode. The function position 1155 includes a connecting slot and a cover for closing the connecting slot, where the connecting slot is configured to be in a shape for being connected to an external line, such as a universal serial bus (USB) interface.

Figure 3:
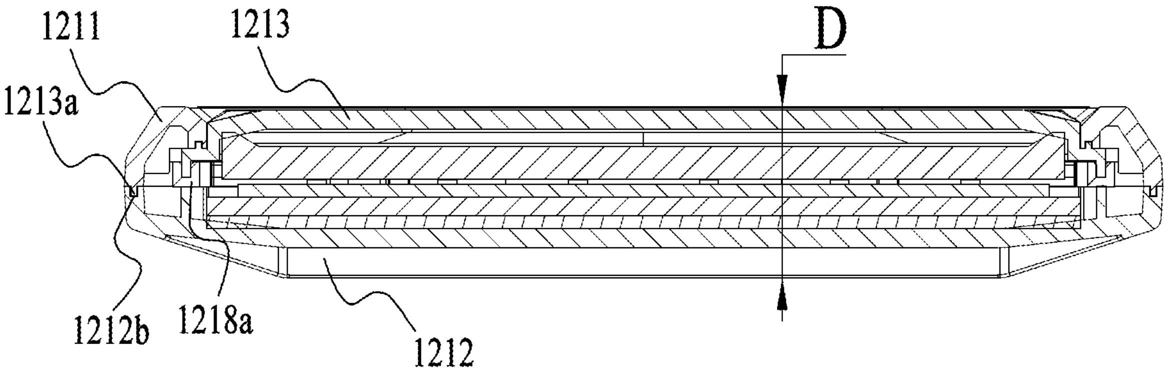
FIG. 3 is a sectional view of a main panel of the lighting device in FIG. 1.
Figure 4:
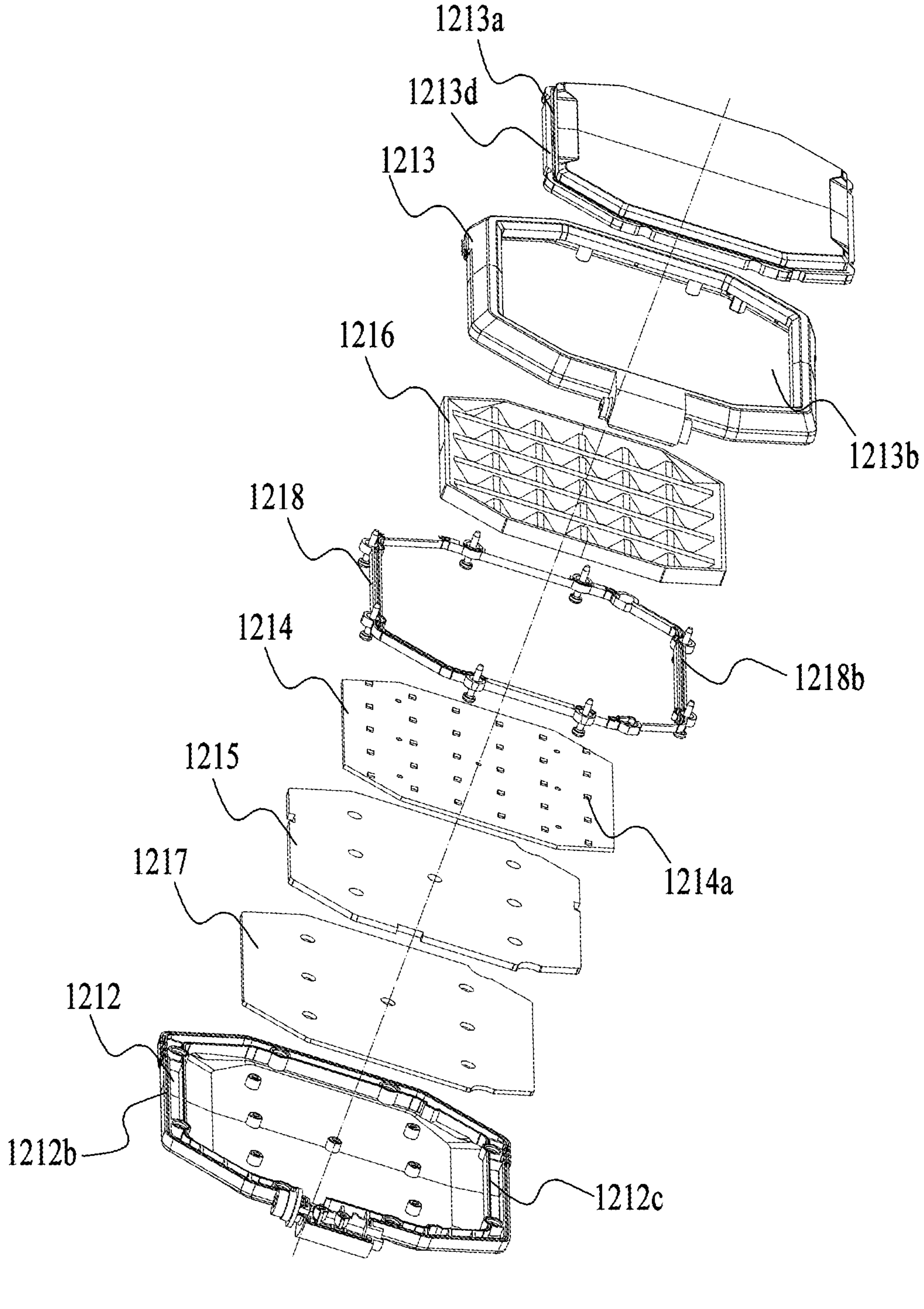
FIG. 4 is an exploded view of a main panel of the lighting device in FIG. 1.
Figure 5:
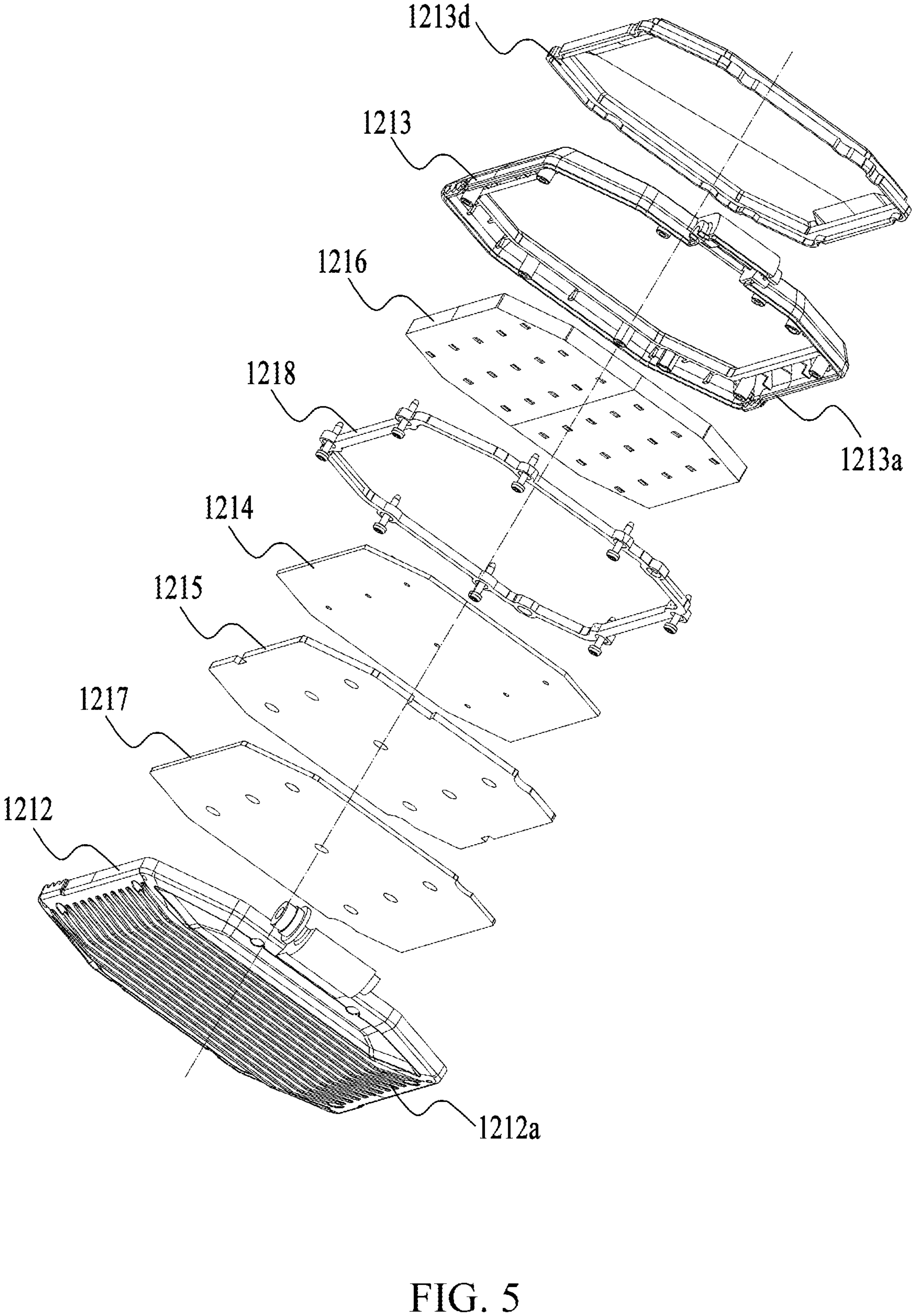
FIG. 5 is an exploded view of the main panel of the lighting device in FIG. 4 from another angle.

As shown in FIGS. 3 to 5, in this example, the main panel 121, the first auxiliary panel 122, the second auxiliary panel 123, and the third auxiliary panel 124 are all configured to have basically the same heat dissipation structure. The main panel 121 is configured to include a casing 1211 and a light board 1214, and the luminous body in this example is the light board 1214 integrated with multiple light sources. The casing 1211 is formed with an accommodation space 1213*c*, and the light board 1214 is disposed in the accommodation space 1213*c*. Specifically, the casing 1211 includes a first casing portion 1212 and a second casing portion 1213, where the first casing portion 1212 and the second casing portion 1213 are connected so as to form the accommodation space 1213*c*. The light board 1214 is provided with light beads 1214*a*. To quickly dissipate heat generated by the light beads 1214*a*, the light board 1214 is configured to be made of an aluminum plate. A heat sink 1215 is further provided on a side of the light board 1214 facing away from the light beads 1214*a*. The heat sink 1215 is fixedly connected to the light board 1214 and can dissipate the heat generated by the light beads 1214*a* on the light board 1214. A reflector cup 1216 is further provided on a side of the light board 1214 facing towards the light beads 1214*a*, and the reflector cup 1216 mates with the light beads 1214*a*. Specifically, to reduce the weight of the entire panel and maintain a relatively good heat dissipation effect, the entire heat sink 1215 is a thin sheet, thereby effectively reducing the weight of the heat sink 1215. Further, a heat conducting member 1217 is further provided between the heat sink and the first casing portion 1212, and the heat conducting member 1217 can transfer heat of the heat sink 1215 to the first casing portion 1212 from which the heat is dissipated.

The light board 1214 or the circuit board is a waterproof structure with a waterproof layer on its surface. The waterproof layer covers at least part of a whole composed of an insulating layer and a first-type electronic component with basically the same thickness through vapor deposition. The waterproof layer covers the entire light board 1214 through plasma-enhanced chemical vapor deposition. Therefore, the light board 1214 will not come into contact with external dust and water vapor, so as to achieve dustproof, waterproof, and corrosion-proof effects.

As an implementation manner, the heat conducting member 1217 is supported by a heat conducting silicone pad with a thermal conductivity greater than or equal to 1.5 W/(m·K) so that the heat of the heat sink 1215 can be quickly dissipated. It is to be understood that the heat conducting member 1217 may also be made of heat conducting materials described below. In the case where the heat conducting member 1217 is made of a carbon nanotube composite material, the carbon nanotube composite material is added to an inside of a rubber elastomer, and the carbon nanotube composite material and a heat conductor with excellent uniformity and a high thermal conductivity are achieved through a high thermal conductivity of the carbon nanotube composite material. In the case where the heat conducting member 1217 is made of a composite material of multilayer graphene and its derivative (graphene oxide), a heat dissipation effect of the light body is enhanced through an excellent Young's modulus, excellent thermal stability, and an excellent thermal conductivity (4000 W/(m·K) to 5000 W/(m·K)) of graphene. A ceramic layer with a high thermal conductivity may also be attached to the surface of the light board 1214. No adhesive is provided between the light board 1214 and the ceramic layer. The light board 1214 is bonded to the ceramic layer through an atomic force between the light board 1214 and crystal grains of the ceramic layer so that a thermal resistance between the light board 1214 and the ceramic layer can be reduced, and thus heat of the light beads 1214*a* is quickly transferred from the light board 1214 to the ceramic layer and then a surface of the first casing portion 1212. The heat conducting member 1217 may also configured to be other materials with an excellent heat conducting effect and excellent thermal stability, which is not repeated herein.

When the heat conducting member 1217 transfers heat to the first casing portion 1212, in order that the heat is quickly dissipated, the first casing portion 1212 is further provided with heat dissipation ribs 1212*a*. The heat dissipation ribs 1212*a* are distributed around an outer surface of the first casing 1211 so that a surface area of the outer surface of the first casing portion 1212 can be effectively increased, thereby increasing heat dissipation efficiency. It is to be understood that the heat dissipation ribs 1212*a* may also be disposed on an outer surface of the second casing portion 1213, so as to further increase the heat dissipation efficiency of the panel. In fact, through the preceding heat dissipation structure, in the case where the light beads 1214*a* inside the panel is in operation, the heat generated by the light beads 1214*a* can be quickly transferred to the heat conducting member 1217 through the heat sink 1215 and quickly transferred to the first casing portion 1212 through the heat conducting member 1217, thereby quickly dissipating heat in the accommodation space 1213*c*. In this example, the heat generated by the light beads 1214*a* is dissipated through heat transfer and air cooling, and the casing 1211 does not need to be provided with separate heat dissipation air ports, thereby effectively increasing the leakproofness of the panel. To further increase the leakproofness of the panel, a sealing structure is further provided.

A material of the casing 1211 includes plastic, or the material of the casing includes resin or similar polymers. A material of at least the second casing portion 1213 includes plastic. A proportion of the plastic in the casing 1211 or the second casing portion 1213 should exceed 80%. In the existing art, aluminum sheets are used as the main heat dissipation elements of the heat dissipation structure, and even the casing made of aluminum is directly used. However, an aluminum sheet structure is bulky in volume and heavy in weight and is inconvenient in many aspects in actual use. In this example, the material of the casing is the plastic. After multiple tests, while the overall mass of the panel is reduced by 40% and the overall thickness of the panel is reduced by 50%, it is ensured that the heat dissipation effect is better than that of an existing structure. In the test of the heat dissipation effect, the temperature of an outer edge of the heat dissipation rib 1212*a* is at least between 40° C. and 60° C., ensuring that the temperature is within a safe touch range of a user, the temperature of a peripheral side and other positions of the casing 1211 is also maintained between 45° C. and 60° C. Based on the heat dissipation structure in this example, a thickness D of the panel assembly 12 may be configured to be greater than or equal to 15 mm and less than or equal to 35 mm, and, in particular, may be configured to be greater than or equal to 20 mm and less than or equal to 32 mm so that the entire panel assembly is lighter. The aluminum sheet structure is replaced with plastic heat dissipation ribs 1212*a*, and the heat sink 1215 and the heat conducting member 1217 sequentially transfer heat to the heat dissipation ribs 1212*a* through heat conduction. The combination of multiple materials and the multilayer structure has both portability and the heat dissipation effect.

Specifically, the first casing portion 1212 and the second casing portion 1213 are provided with a slot structure. As an implementation manner, the first casing portion 1212 is formed with a groove 1212*b*, and the second casing portion 1213 is formed with a protrusion 1213*a*. In the case where the first casing portion 1212 and the second casing portion 1213 are connected to form a whole, the protrusion 1213*a* mates with the groove 1212*b*, thereby forming a first layer of sealing structure. It is to be understood that it is also feasible that the first casing portion 1212 is formed with a protrusion, the second casing portion 1213 is formed with a groove, and the protrusion mates with the groove so as to achieve leakproofness, which is not limited herein. In this example, the second casing portion 1213 is further formed with an opening 1213*b* which can allow light to be emitted out. Over the opening 1213*b*, a transparent cover 1213*d* is further provided for light to pass through, and the transparent cover 1213*d* closes the opening 1213*b*. In this example, the transparent cover 1213*d* and the second casing portion 1213 are also provided with a slot structure basically the same as the slot structure provided on the first casing portion 1212 and the second casing portion 1213, which is not repeated herein. In fact, the slot structure provided on the first casing portion 1212 and the second casing portion 1213 and the slot structure provided on the transparent cover 1213*d* and the second casing portion 1213 together form the first layer of sealing structure for the accommodation space 1213*c*.

A sealing ring 1218 that mates with the transparent cover 1213*d* is further provided in the accommodation space 1213*c*. Specifically, the first casing portion 1212 is formed with or connected to a first limiting portion 1212*c* that mates with the sealing ring 1218, and the sealing ring 1218 is formed with a second limiting portion 1218*a* that mates with the first limiting portion 1212*c*. When the first limiting portion 1212*c* mates with the second limiting portion 1218*a*, the sealing ring 1218 mates with the first casing portion 1212 and is at least partially fixed to the first casing portion 1212. A sealing groove 1218*b* is further provided on a side of the sealing ring 1218 facing away from the second limiting portion 1218*a*, and the transparent cover 1213*d* can be at least partially disposed in the sealing groove 1218*b*, thereby achieving secondary sealing. The transparent cover 1213*d* is also compressed by the second casing portion 1213 and further compressed into the sealing groove 1218*b*, thereby enhancing a sealing effect.

Figure 6:
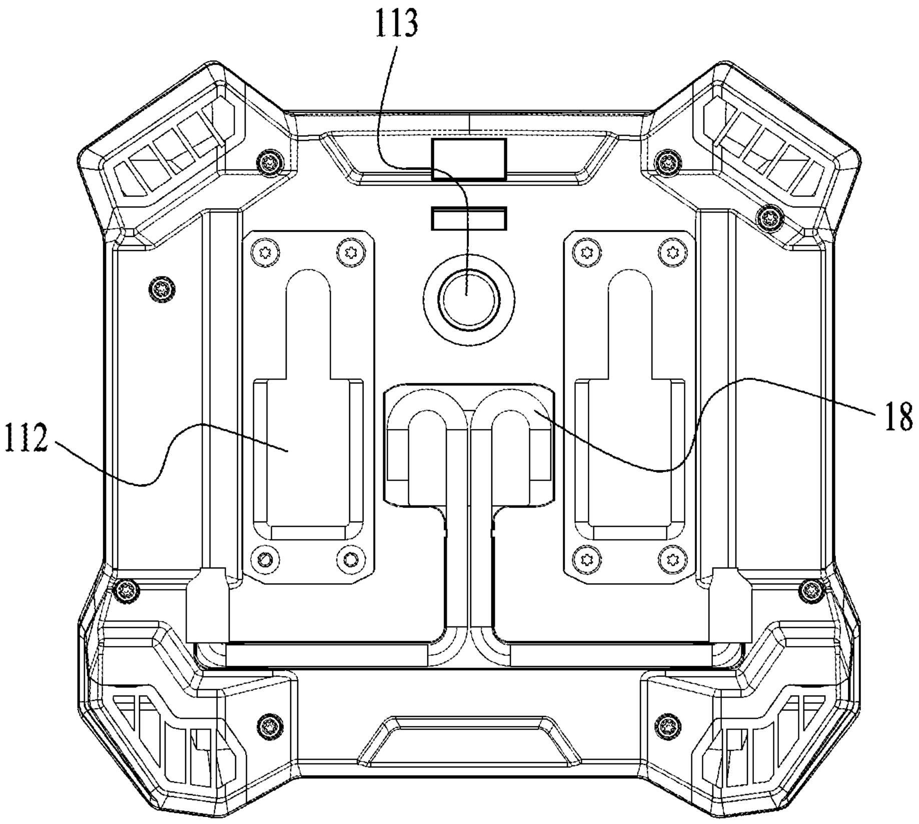
FIG. 6 is a bottom view of the lighting device in FIG. 1.

As shown in FIG. 6, a hook assembly 18 is further provided on a lower side of the base 11 of the lighting device 100. The hook assembly 18 is rotatably connected to the base 11 and can rotate to a storage position and a hanging position. When the hook assembly 18 is in the storage position, in the up-and-down direction, a hook is located on an inner side of the base 11, that is, the hook does not protrude from a plane where a lowermost side of the base 11 is located. When the hook assembly 18 is in the hanging position, the hook can rotate out and protrude from the plane where the lowermost side of the base 11 is located. In this case, the lighting device 100 may be hung at a suitable position. FIG. 6 further shows a sliding groove 112 that may connect the lighting device 100 to another tool, that is, another accessory may be connected to the sliding groove 112 of the lighting device 100 and fixed to another tool. In addition, the base 11 is further formed with or connected to a nut 113 to be connected to another tool, where the nut 113 is configured to fix the lighting device 100 to other tools or other places.

Figure 7:
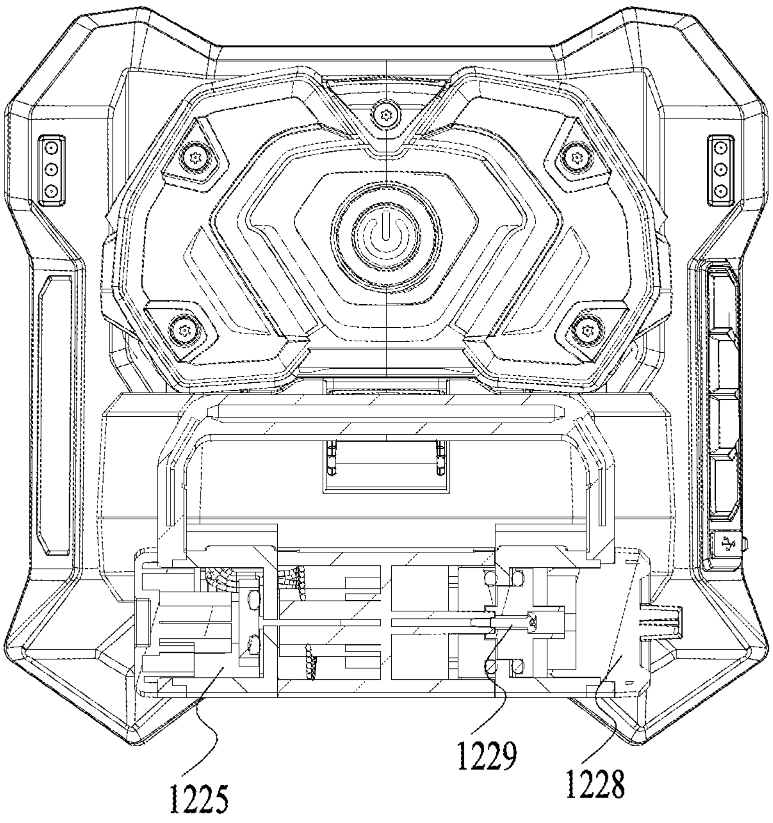
FIG. 7 is a sectional view of a pivot of the lighting device in FIG. 1.
Figure 8:
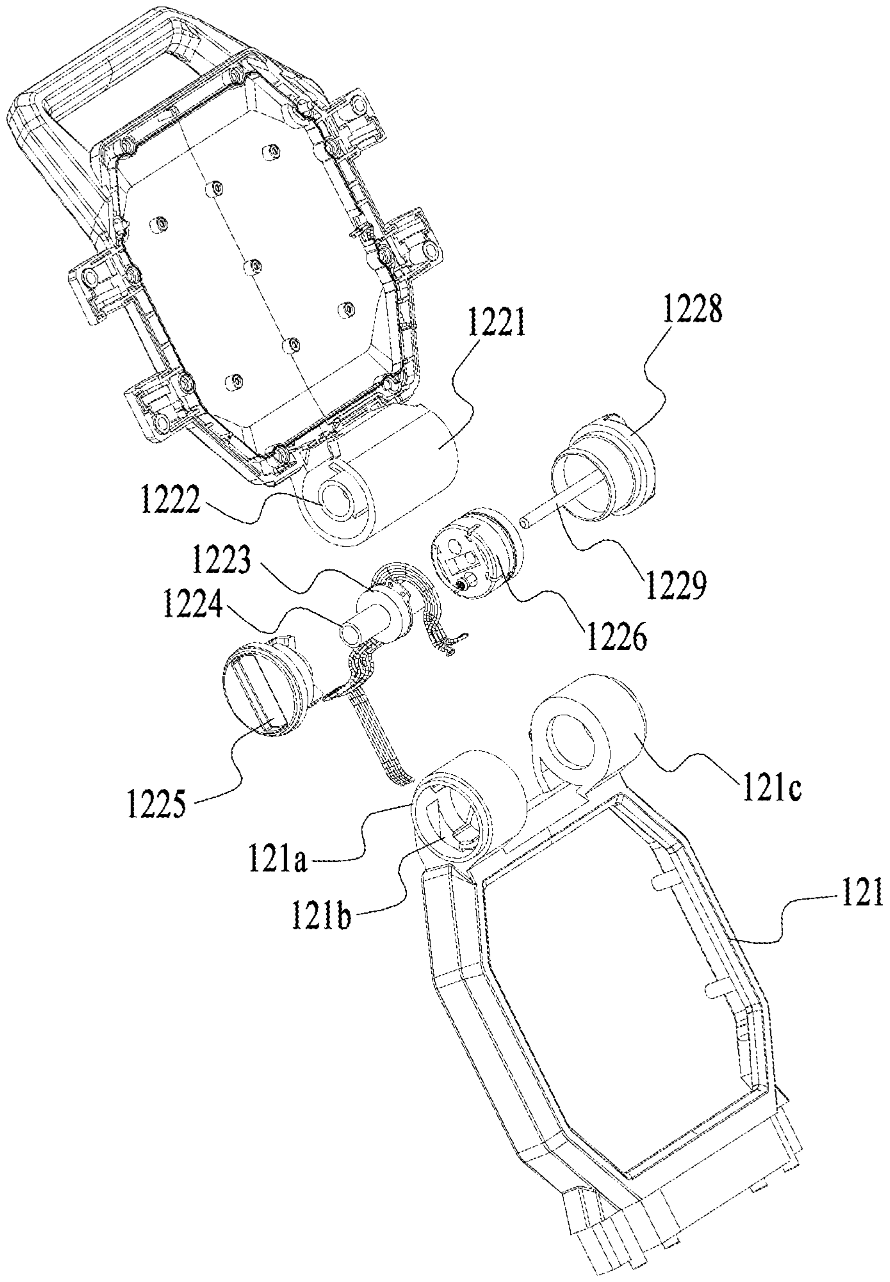
FIG. 8 is an exploded view of a connection between a main panel and a first auxiliary panel of the lighting device in FIG. 1.
Figure 9:
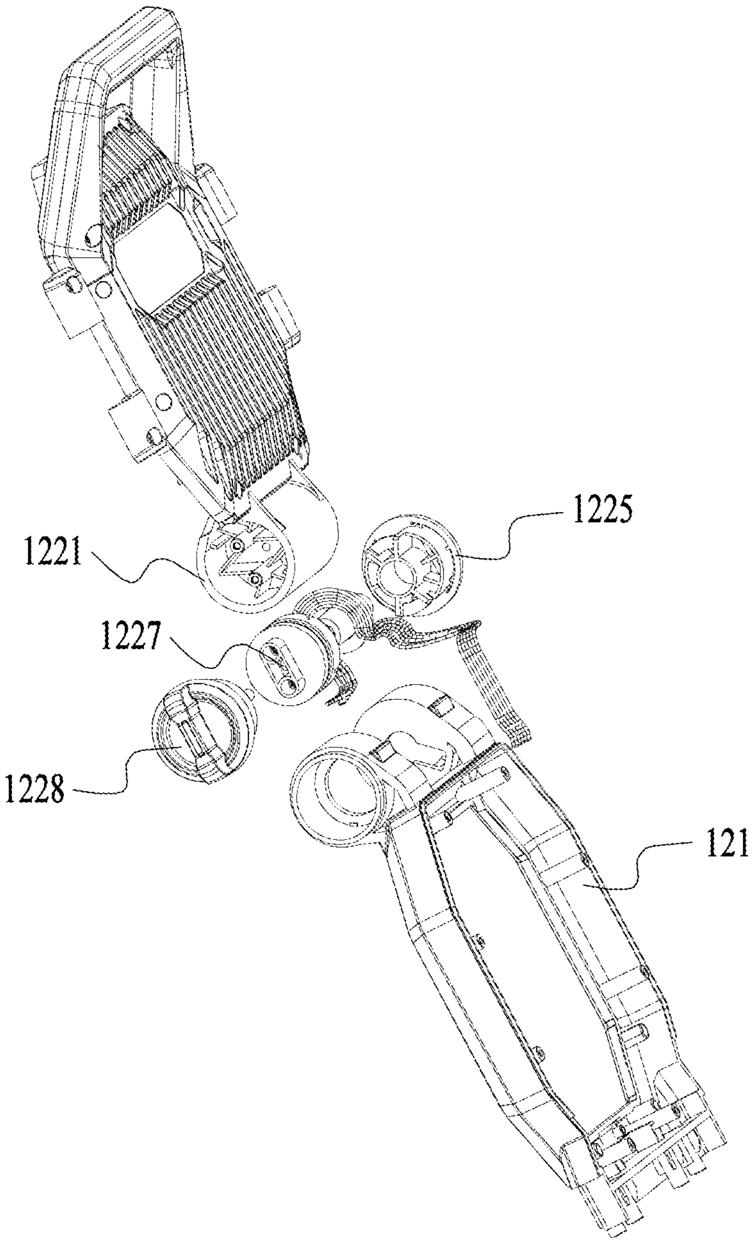
FIG. 9 is an exploded view of a connection between the main panel and the first auxiliary panel of the lighting device in FIG. 8 from another angle.

As shown in FIGS. 7 to 9, the first auxiliary panel 122 is rotatably connected to the main panel 121, and a damping mechanism is provided. Specifically, the first auxiliary panel 122 is connected to or formed with a pivot 1221 with a hollow interior and formed with a first pivot portion 1222. The main panel 121 is connected to or formed with a first sleeve 121*a* and a second sleeve 121*c* for connecting the pivot 1221. Each of the first sleeve 121*a* and the second sleeve 121*c* is formed with a through hole through which the first pivot portion 1222 may pass. The first sleeve 121*a* is further formed with a channel 121*b* through which wires may pass. In this example, the wires pass out of the main panel 121 through the channel 121*b* of the first sleeve 121*a*, are distributed around the first pivot portion 1222, and are wound out of an opening 1213*b* of the pivot 1221 and then wound into the first auxiliary panel 122. Therefore, in the case where the first auxiliary panel 122 and the main panel 121 rotate relative to each other, the wires do not interfere with the pivot 1221. More specifically, the lighting device 100 includes a retaining ring 1223 for at least partially enclosing the wires and the retaining ring 1223 is distributed around a second pivot portion 1224. The second pivot portion 1224 is at least partially inserted into an inner side of the first pivot portion 1222 so that the wires are enclosed by the retaining ring 1223 and prevented from being detached from the first pivot portion 1222. The lighting device 100 further includes a first knob 1225 for fixing the second pivot portion 1224, where the first knob 1225 is formed with an accommodation groove for accommodating at least part of the second pivot portion 1224. The accommodation groove is clamped or threaded to the second pivot portion 1224, which is not repeated herein. The first knob 1225 is also clamped to the first sleeve 121*a* so that the first knob 1225 can be fixed to the first sleeve 121*a*. The lighting device 100 further includes a damper piece 1226 detachably connected to the pivot 1221. When the first auxiliary panel 122 rotates relative to the main panel 121, the damper piece 1226 can implement a damping effect between the pivot 1221 and the second sleeve 121*c* so that the first auxiliary panel 122 is fixed at a preset position relative to the main panel 121. The lighting device 100 further includes an adjustment member 1228 that adjusts a magnitude of a damping force of the damper piece 1226. The adjustment member 1228 is formed with or connected to an adjustment rod 1229. The damper piece 1226 is formed with a connecting hole 1227 that mates with the adjustment rod 1229. When the adjustment rod 1229 is inserted into the connecting hole 1227, the adjustment rod 1229 can adjust the magnitude of the damping force of the damper piece 1226 so that the following case is avoided: the first auxiliary panel 122 is loosened when rotating to the preset position relative to the main panel 121 and cannot be fixed at the preset position.

Figure 10:
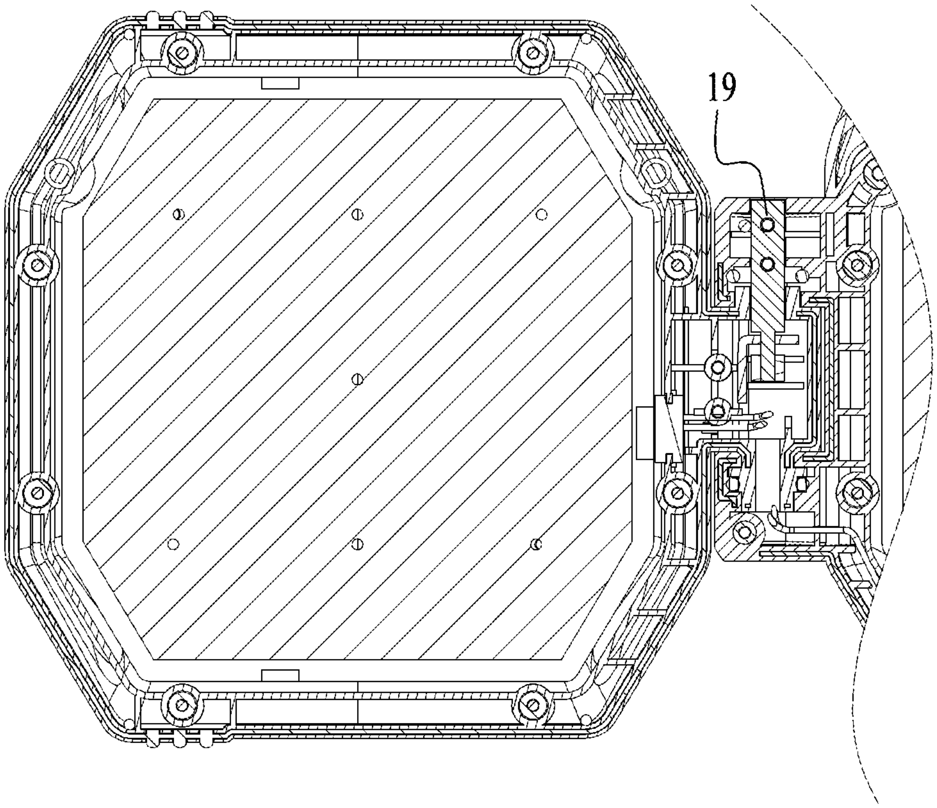
FIG. 10 is a sectional view of a connection between a first auxiliary panel and a second auxiliary panel of the lighting device in FIG. 1.
Figure 11:
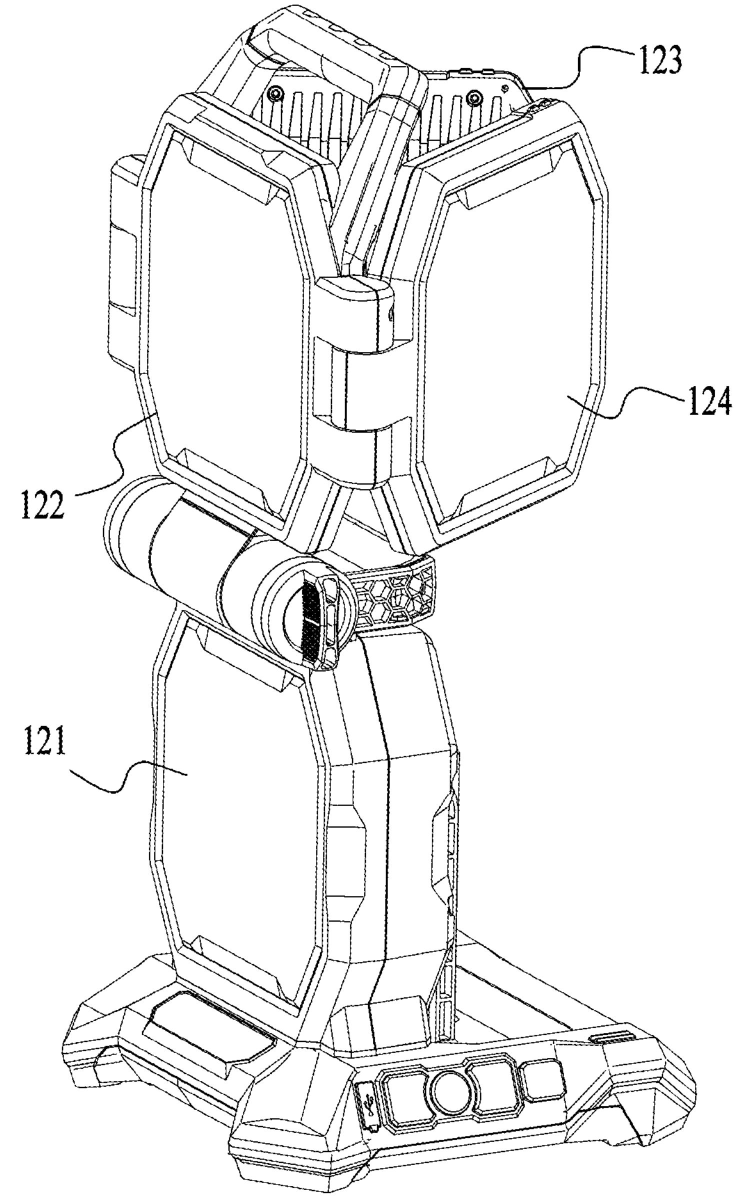
FIG. 11 is a first structural view of an auxiliary illumination region formed by a lighting device.
Figure 12:
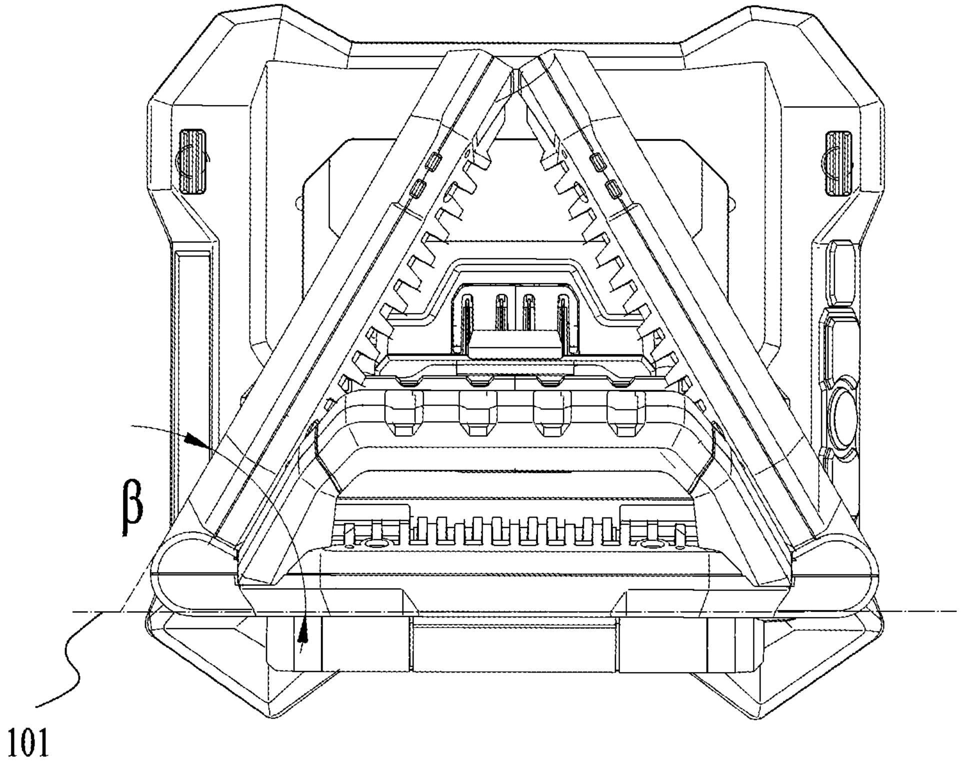
FIG. 12 is a top view of the lighting device in FIG. 11.
Figure 13:
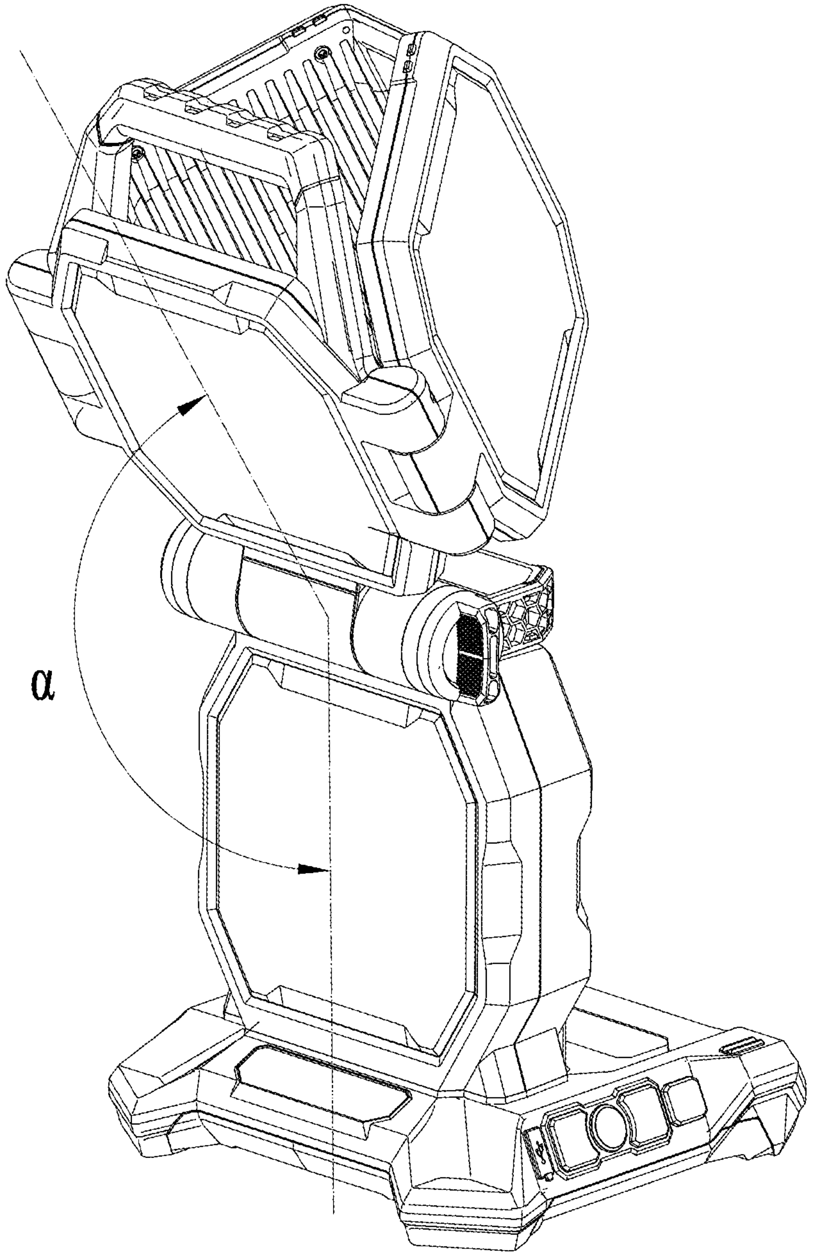
FIG. 13 is a second structural view of an auxiliary illumination region formed by a lighting device.
Figure 14:
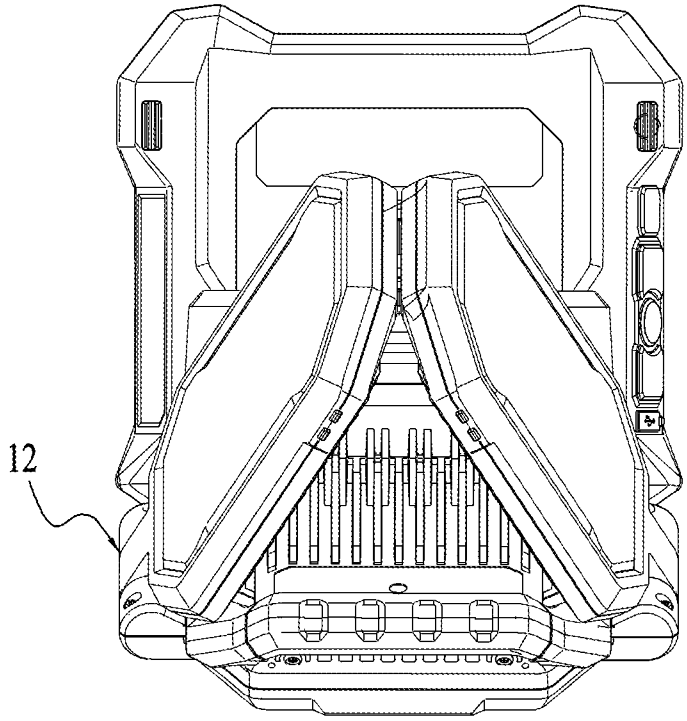
FIG. 14 is a top view of the lighting device in FIG. 13.
Figure 15:
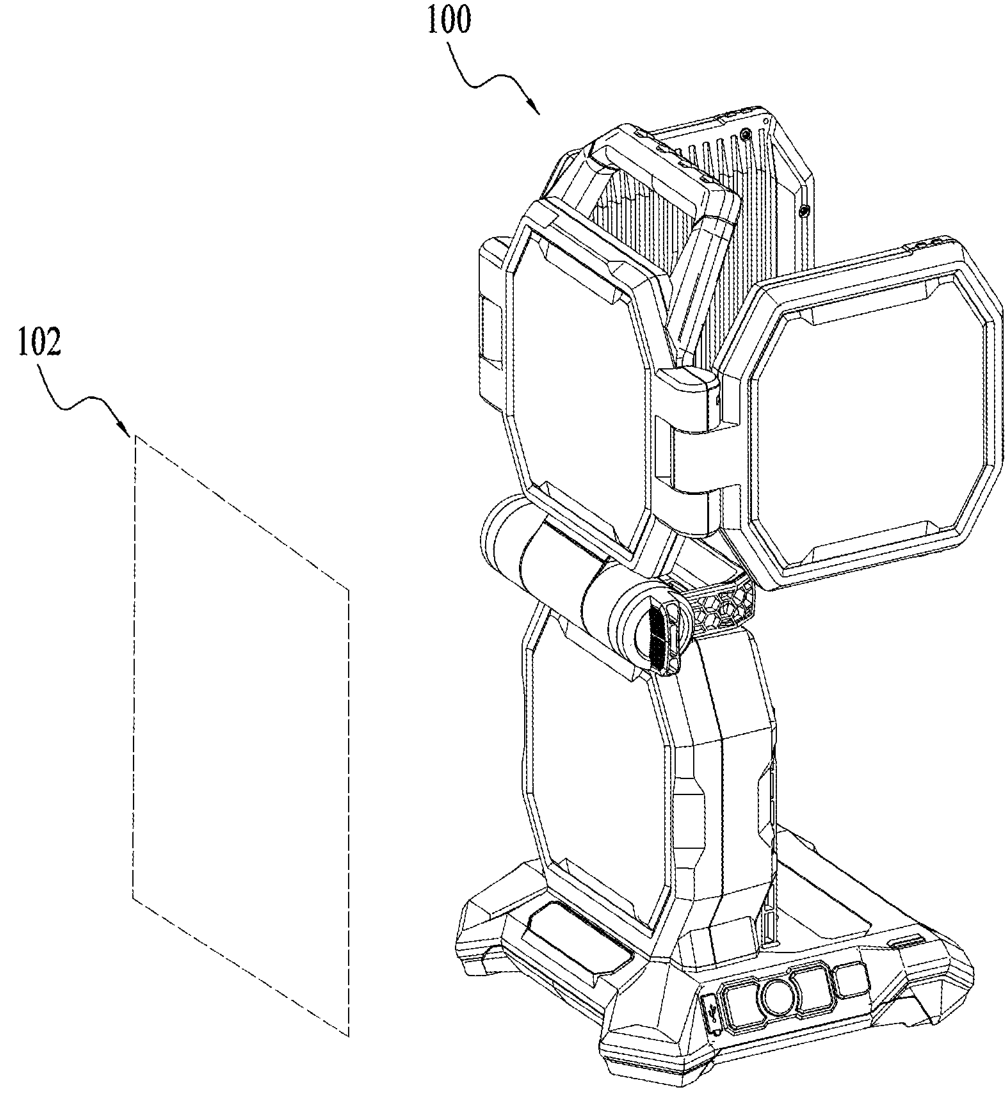
FIG. 15 is a third structural view of an auxiliary illumination region formed by a lighting device.

As shown in FIG. 10, the second auxiliary panel 123 is rotatably connected to the first auxiliary panel 122, and a damping device 19 is formed at a connecting portion so that the second auxiliary panel 123 can rotate to any position relative to the first auxiliary panel 122 and be fixed at a current position. It is to be understood that the third auxiliary panel 124 is rotatably connected to the first auxiliary panel 122, and the damping device 19 is formed at the connecting portion so that the third auxiliary panel 124 can rotate to any position relative to the first auxiliary panel 122 and be fixed at a current position.

As shown in FIGS. 11 to 15, the position and attitude of each panel during use are shown in the example. To satisfy requirements of the user, the attitude of the lighting device

100 may be adjusted so as to form a main illumination region and an auxiliary illumination region. The main illumination region refers to the case where the panel assembly directly illuminates a target position or a large part of light can illuminate the target position at a current power, and the auxiliary illumination region refers to the case where the panel assembly indirectly illuminates the target position or part of the light does not illuminate the target position at the current power. The auxiliary illumination region forms background light or ambient light. It is to be understood that a distance at which the lighting device 100 in this example is used is not limited. However, since the lighting device 100 in this example is more suitable for an illumination requirement for operation in a large space, the formation of the preceding auxiliary illumination region is based on that an illuminated target is located in front of and at a certain distance from the lighting device 100. Since the main panel 121 is fixed to the base 11, the main illumination region includes at least light emitted by the main panel 121 so as to ensure the brightness required for operation. Specifically, a surface of the main panel 121 forms a main illumination plane 101 from which the light is emitted. In the case where at least part of the auxiliary panels are located on a front side of the main illumination plane 101, this part forms the main illumination region; and in the case where at least part of the auxiliary panels are located on a rear side of the main illumination plane 101, this part forms the auxiliary illumination region. In another manner of description, when an included angle $\alpha$ between the first auxiliary panel and the main illumination plane is $\leq 180°$, part of the multiple auxiliary panels forms the main illumination region; when $\alpha \geq 180°$, part of the multiple auxiliary panels forms the auxiliary illumination region. In another manner of description, the lighting device has a projection plane 102 that receives light and is parallel to the main illumination plane 101, and it is assumed that the projection plane 102 is a target that actually receives illumination. Light emitted by the multiple auxiliary panels is projected on the projection plane 102 so as to form an actual illumination area. In the case where the multiple auxiliary panels are parallel to the projection plane 102, the light emitted by the multiple auxiliary panels is projected on the projection plane 102 so as to form a maximum illumination area. In the case where a ratio of the actual illumination area to the maximum illumination area is less than or equal to 0.5, the multiple auxiliary panels form the auxiliary illumination region.

Further, in the second manner of description, the first auxiliary panel has a first illumination plane from which light is emitted, the second auxiliary panel has a second illumination plane from which light is emitted, and an angle $\beta$ is formed between the first illumination plane and the second illumination plane. In the case where $90° \leq \alpha \leq 180°$ and $\beta \geq 180°$, both the first auxiliary panel 122 and the second auxiliary panel 123 form the main illumination region. In the case where $\alpha \geq 180°$ and $\beta \geq 180°$, in addition to the first auxiliary panel 122, part of the second auxiliary panel 123 can also form the auxiliary illumination region. In the case where $\alpha \geq 180°$ and $\beta \leq 180°$, the first auxiliary panel 122 and the second auxiliary panel 123 form the auxiliary illumination region. Normally, for a better illumination effect, the user does not configure the first auxiliary panel 122 to be in a state where $\alpha \leq 90°$. For this special case where $\alpha \leq 90°$, except the main panel, all the auxiliary panels form the auxiliary illumination region. In the example, when the third auxiliary panel 124 is further provided, the third auxiliary panel 124 is configured in the same manner as the second auxiliary panel 123.

Figure 16:
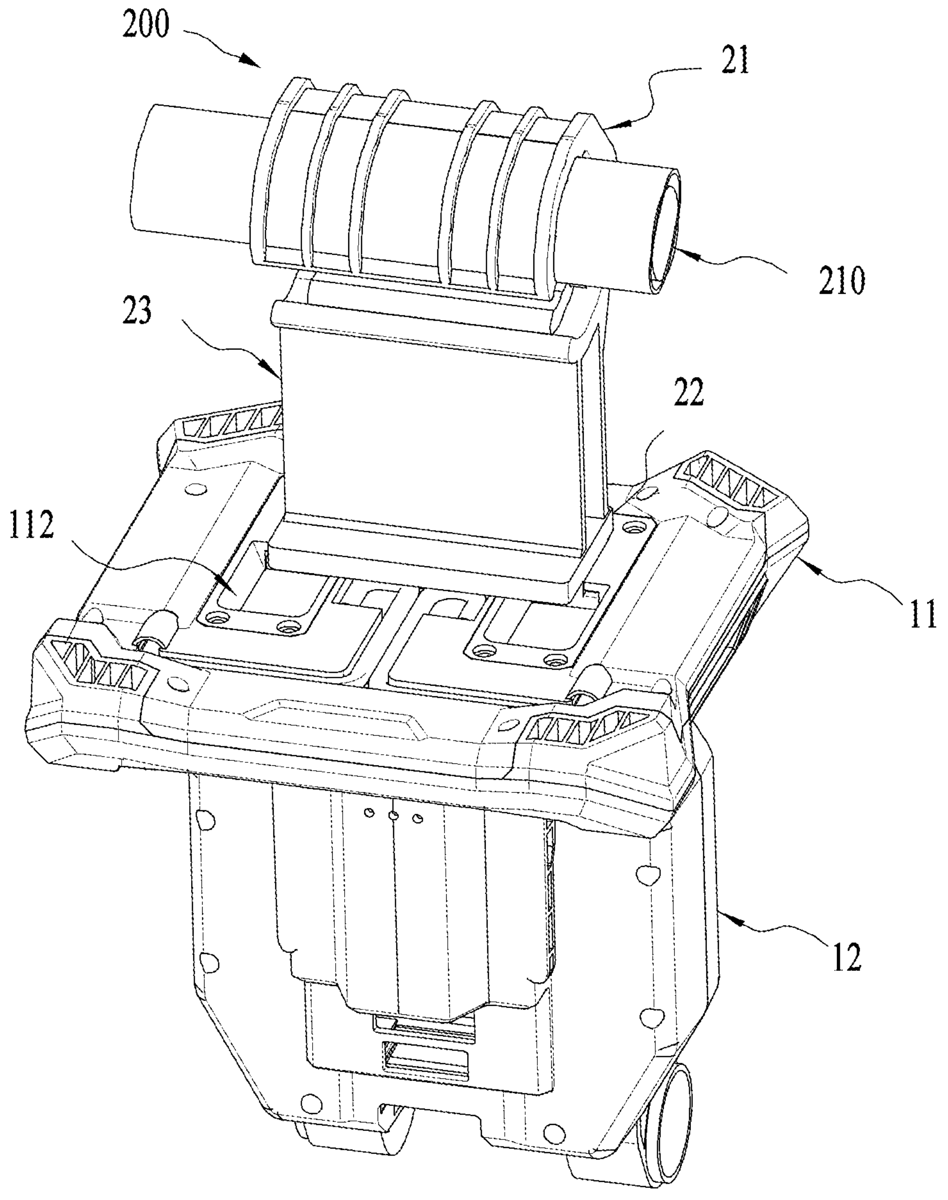
FIG. 16 is a schematic view illustrating assembly of part of a structure of a lighting device and an accessory.
Figure 17:
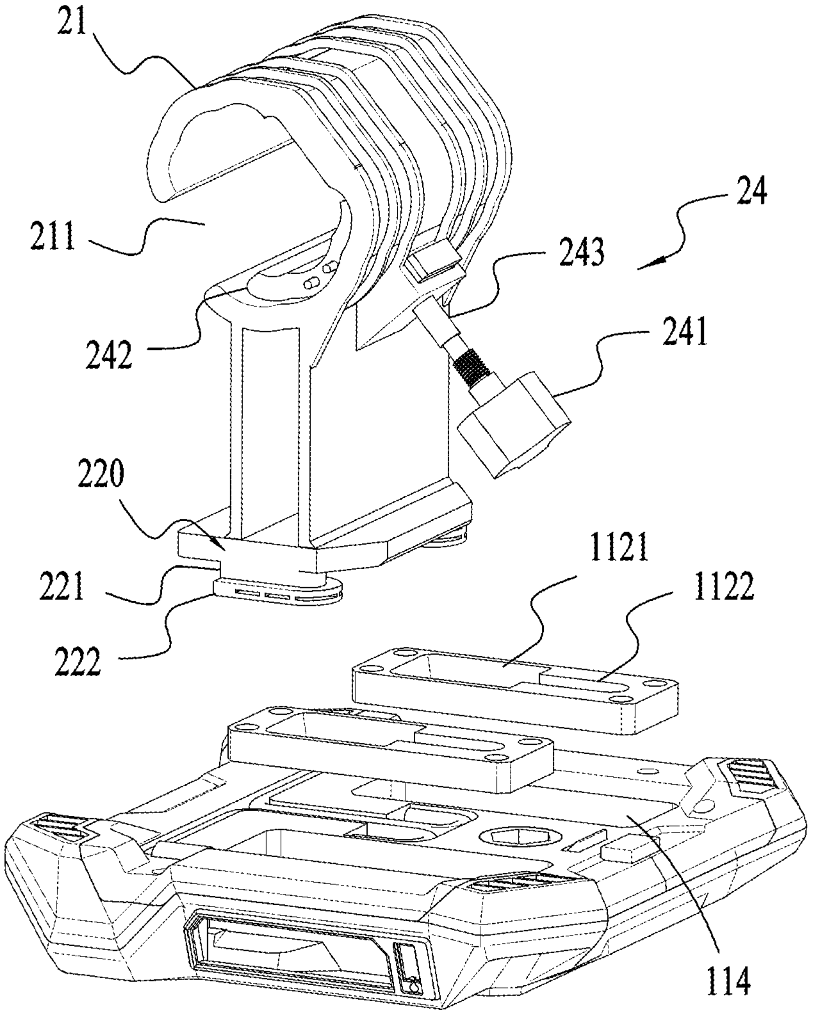
FIG. 17 is an exploded view of part of a structure of a lighting device and an accessory.
Figure 18:
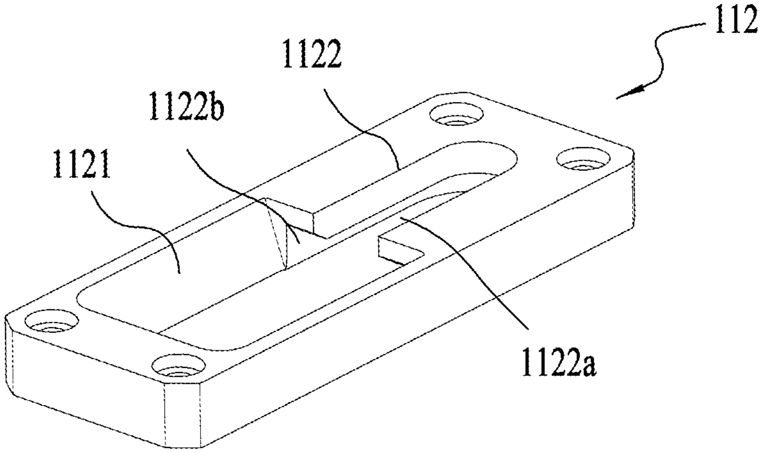
FIG. 18 is a structural view of a sliding groove of a lighting device.

FIGS. 16 to 18 show the case where an accessory 200 connected to the sliding groove 112 is hung outside. The lighting device 100, the accessory 200, and an external structure 210 form a lighting system. Of course, in other examples, if the external structure 210 is provided with a corresponding structure for connecting the sliding groove 112, the accessory 200 may not be provided, and the external structure 210 may be directly connected to the lighting device 100.

One end of the accessory 200 is detachably connected to the external structure 210 and the other end of the accessory 200 is detachably connected to the base 11. The external structure 210 may be a rod or handle of another tool or may be a structure in an external environment, which is not limited herein. The accessory 200 includes a first connecting portion 21 and a second connecting portion 22, where the first connecting portion 21 and the second connecting portion 22 are connected to the external structure 210 and the base 11, respectively.

The first connecting portion 21 at least partially covers the external structure 210 so as to form a stable and reliable connection. In other words, the first connecting portion 21 includes a casing at least provided with an opening 211, and the opening 211 places a connected part of the external structure 210 and connects the connected part to the casing. As a manner of connection to a common external structure, this example provides a schematic view of connection to a rod-shaped external structure. Specifically, the first connecting portion 21 may be configured to be a ring, a hook, or a claw-shaped structure hung on or connected to the rod-shaped external structure 210. In other examples, the first connecting portion 21 may also be other common connecting structures. It is to be understood that the first connecting portion 21 may be configured to be a detachable and replaceable structure to adapt to various different external structures 300.

The second connecting portion 22 is directly or indirectly connected to the first connecting portion 21, and the second connecting portion 22 is formed with a sliding portion 220 connected to the sliding groove 112. The sliding groove 112 includes a first cavity 1121 for buffering movement of the sliding portion 220 and a second cavity 1122 connected to the sliding portion 220. A diameter of the first cavity 1121 is greater than or equal to a maximum diameter of the sliding portion 220. The first cavity 1121 accommodates the sliding portion 220 to be connected to the second cavity 1122. The sliding portion 220 moves in the first cavity 1121 and enters the second cavity 1122 until the sliding portion 220 is connected to the second cavity 1122.

The sliding portion 220 is formed with a first sliding portion 221 and a second sliding portion 222 with a diameter greater than a diameter of the first sliding portion 221. The second cavity 1122 includes a first connecting groove **1122*a* and a second connecting groove 1122*b*. After the sliding portion 220 is connected to the sliding groove 112, the first connecting groove 1122*a* is connected to the first sliding portion 221 correspondingly, and the second connecting groove 1122*b* is connected to the second sliding portion 222 correspondingly. In other words, the first connecting groove 1122*a* and the first sliding portion 221 are at least partially the same in diameter, and the second connecting groove 1122*b* and the second sliding portion 222** are at least partially the same in diameter.

The base 11 is further provided with an accommodation cavity 114 for accommodating and placing the sliding groove 112. Specifically, the sliding groove 112 is detachably connected to the accommodation cavity 114 by a fastener.

The accessory 200 further includes an extension portion 23 connected to the first connecting portion 21 and the second connecting portion 22. In this example, the extension portion 23 is a fixed support structure. In other examples, it is conceivable that the extension portion 23 may be provided with an adjustment mechanism that can adjust relative positions or orientations of the first connecting portion 21 and the second connecting portion 22.

The accessory 200 includes a tensioning device 24 configured to lock the connection to the external structure 210. The tensioning device 24 includes an operating member 241, a locking member 242, and a transmission member 243. The operating member 241 is operated by an operator. The operating member 241 drives the transmission member 243 to move so that the locking member 242 locks the accessory 200 and the external structure 210. Specifically, the locking member 242 is provided at one end of the transmission member 243, and the operating member 241 is connected at the other end of the transmission member 243. The transmission member 243 passes through the first connecting portion 21 so that the locking member 242 is located on an inner side of the first connecting portion 21 and in contact with the external structure 210, and the operating member 241 is located on an outer side of the first connecting portion 21. The locking member 242 may be made of a rigid material or a flexible and elastic material such as rubber.

Figure 19:
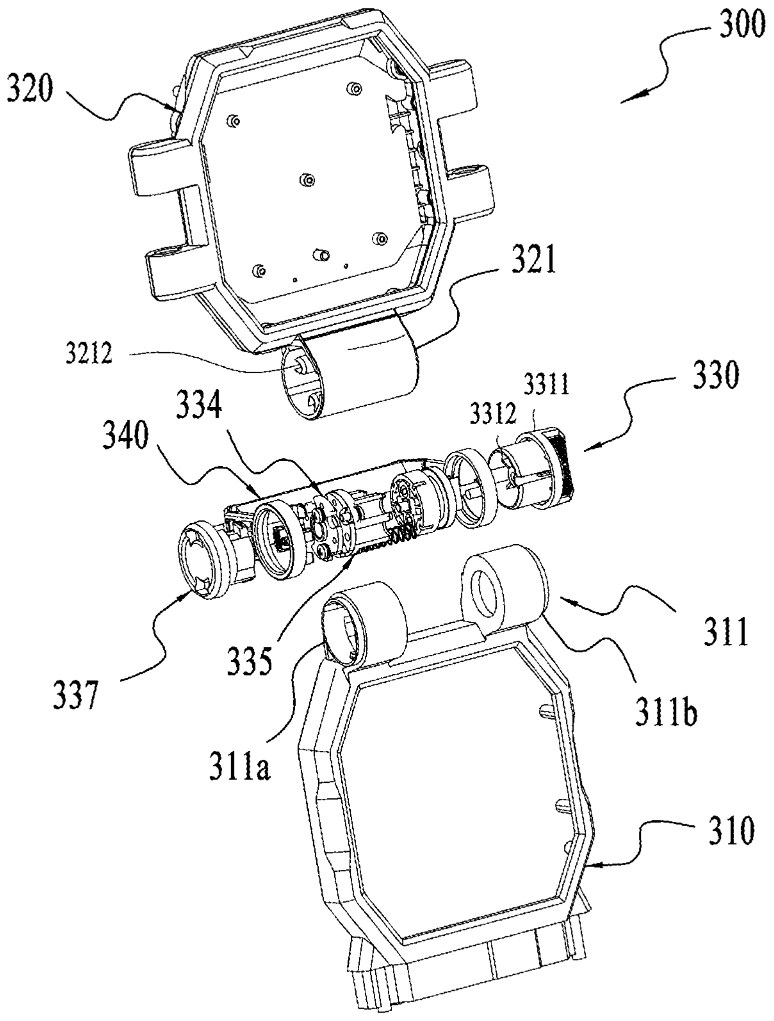
FIG. 19 is an exploded view of part of structures of a main panel and a first auxiliary panel of a lighting device according to a second example.
Figure 20:
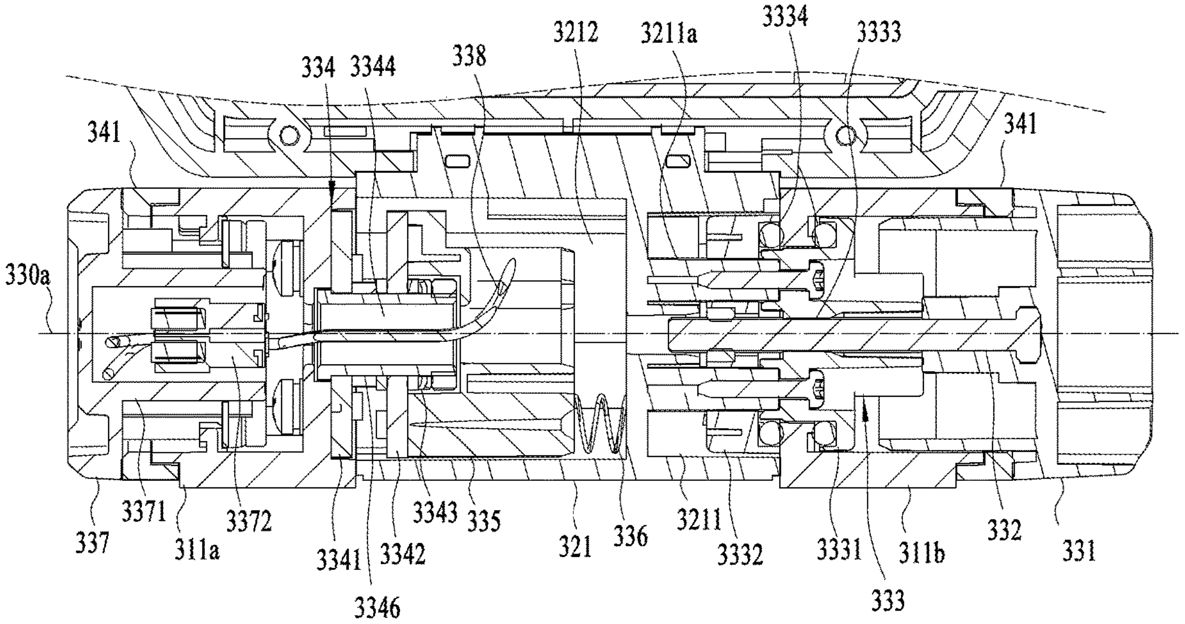
FIG. 20 is a sectional view of a locking damping mechanism of a lighting device.
Figure 21:
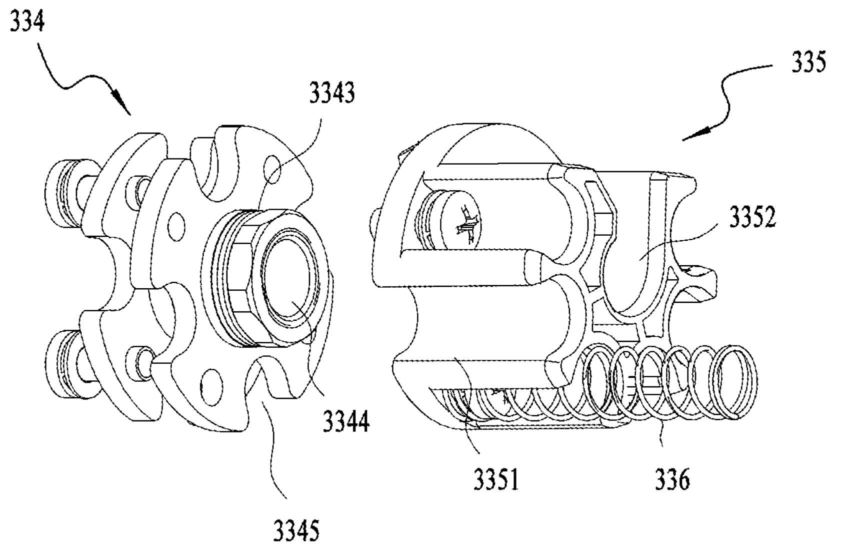
FIG. 21 is a partial structural view of a locking damping mechanism of a lighting device.

As shown in FIGS. 19 to 21, in another example of the present solution, a lighting device 300 is provided, and the structure the same as or corresponding to the structure in the previous example is not repeated herein. For brevity, only differences between example two and example one are described.

A first auxiliary panel 320 and a main panel 310 of the lighting device 300 are rotatably connected, and a locking damping mechanism 330 is provided. Specifically, the first auxiliary panel 320 is connected to or formed with a pivot 321 with a hollow interior. The main panel 310 is connected to or formed with a sleeve 311 for connecting the pivot 321, where the sleeve 311 has a hollow interior and two open ends. When the first auxiliary panel 320 switches between a folded state and a use state, the pivot 321 rotates relative to the sleeve 311 around an adjustment axis 330*a*. The sleeve 311 includes a first sleeve 311*a* and a second sleeve 311*b* connected to two ends of the pivot 321, respectively.

The locking damping mechanism 330 is provided between the pivot 321 and the sleeve 311 and provides a first resistance for the relative movement of the first auxiliary panel 320. In the case where the first resistance is large enough, the locking damping mechanism can lock the first auxiliary panel 320 and the main panel 310. The first resistance being large enough means that the first resistance is greater than a preset value determined by a specific structure of the locking damping mechanism 330. Specifically, in the case where the first resistance is greater than the preset value, a rotation force provided by the user and an additional force from the outside on the lighting device 300 are much less than the resistance so that the locking damping mechanism 330 locks the first auxiliary panel 320 and the main panel 310.

The locking damping mechanism 330 includes an adjustment member 331 configured to adjust a magnitude of the resistance provided by the locking damping mechanism 330. The adjustment member 331 is disposed at one end of the first sleeve 311*a* or one end of the second sleeve 311*b*. The adjustment member 331 is formed with an operating portion 3311 disposed on an outside of the sleeve and an abutting portion 3312 extending into the sleeve 311. The operating portion 3311 may be a knob, a wrench, or similar operable members. The abutting portion 3312 may abut against other structures of the sleeve 311 in a certain state. In this example, the adjustment member 331 is disposed at an outer end of the second sleeve 311*b* and can close an opening of the second sleeve 311*b*. The adjustment member 331 is connected to or formed with an adjustment rod 332 that can move according to the rotation of the adjustment member 331. Specifically, one end of the adjustment rod 332 is fixed in the abutting portion 3312 and the other end of the adjustment rod 332 passes through the second sleeve 311*b* and extends into the pivot 321.

The locking damping mechanism 330 further includes a damper piece, where the damper piece includes a first damper piece 333 and a second damper piece 334. The first damper piece 333 mates with the adjustment piece 331 for the user to adjust a resistance between the main panel 310 and the first auxiliary panel 320. Specifically, the first damper piece 333 includes a first fixed member 3331 and a first driven member 3332 that mate with each other. A first end of the first fixed member 3331 is connected to a second end of the second sleeve 311*b*, and a second end of the first fixed member 3331 passes through an opening of the second end of the second sleeve 311*b* and is fixedly connected to one end of the pivot 321. Specifically, the second end of the first fixed member 3331 is fixedly connected to the pivot 321 by a fastener. The first end of the first fixed member 3331 abuts against the abutting portion 3312 of the adjustment member 331 in a certain state. The first driven member 3332 is movably disposed in one end of the hollow pivot 321. The first end of the first fixed member 3331 is disposed in a hollow part of the pivot 321, and the second end of the first fixed member 3331 is close to an edge of the second sleeve 311*b* and the first fixed member 3331. Specifically, the second end of the second sleeve 311*b* is formed with a convex edge, that is, a diameter of the opening of the second end is less than a diameter of the second sleeve 311*b* so that part of the first fixed member 3331 and the first driven member 3332 can clamp the convex edge. Through and aligned connecting holes 3333 are provided in the middle of the first fixed member 3331 and the first driven member 3332, the adjustment rod 332 passes through the connecting holes 3333, and an end of the adjustment rod 332 is connected to the first driven member 3332. The end of the adjustment rod 332 is formed with a thread, and correspondingly, the connecting hole 3333 of the first driven member 3332 is formed with a thread or connected to an accessory with a thread so that the first driven member 3332 is connected to the adjustment rod 332 and rotates as the adjustment rod 332 rotates. A gasket 3334 is further provided between the first fixed member 3331 and the first driven member 3332 and the convex edge and may especially be made of a flexible material so as to improve friction damping. The specific use process is as follows: the user operates the operating portion 3311 of the adjustment member 331 to rotate so that the adjustment member 331 advances along the adjustment axis 330*a* toward the sleeve 311, and the adjustment member 331 drives the adjustment rod 332 to rotate; when the abutting portion 3312 moves and abuts against the first fixed member 3331, or when the operating portion 3311 abuts against the edge of the second sleeve 311*b*, the adjustment member 331 and the adjustment rod 332 stop moving along the adjustment axis 330*a* and can only move around the adjustment axis 330*a* at a fixed position. At this time, the first driven member 3332 moves on the adjustment rod 332 along the thread and the adjustment axis 330*a* toward the adjustment member 331 so that the first driven member 3332 slowly approaches the first fixed member 3331, and the first driven member 3332 and the first fixed member 3331 clamp the second sleeve 311*b* and the pivot 321, thereby achieving the damping effect between the main panel 310 and the first auxiliary panel 320.

The pivot 321 is formed with a first cavity 3211 and a second cavity 3212, where the first damper piece 333 and the second damper piece 334 are disposed in the first cavity 3211 and the second cavity 3212, respectively, and the first cavity 3211 and the second cavity 3212 may be interconnected or divided. The first cavity 3211 is provided with a connecting portion 3211*a*, the connecting portion 3211*a* is formed with a special-shaped groove, the first fixed member 3331 is connected to the connecting portion 3211*a* through a groove in a corresponding shape, and the groove of the first fixed member 3331 is fixedly connected to the groove of the connecting portion 3211*a* by a fastener. The fixed connection here is described relative to the first driven member 3332 rather than a connection and assembly relationship in which members are never detachable or are integrally formed. In fact, the first fixed member 3331 is a detachable member which is a fixed structure connected via another member. In other examples, the first fixed member 3331 and the connecting portion 3211*a* may be connected in other manners, which is not limited herein.

The second damper piece 334 is at least partially disposed in the second cavity 3212 and configured to provide a second resistance for the rotation of the first auxiliary panel 320 relative to the main panel 310 in normal use, where the resistance can hinder, to a certain degree, the smooth and rapid rotation between the first auxiliary panel 320 and the main panel 310, but does not completely lock the first auxiliary panel 320 and the main panel 310. It is to be understood that the second resistance is always less than the preset value. The second damper piece 334 can provide the resistance for the rotation of the first auxiliary panel during daily use and ensure that the first auxiliary panel stops at a position. In conjunction with the first damper piece 333, the second damper piece 334 can increase the service life and increase and adjust the stability of the first auxiliary panel 320 at this position in a special scenario, where the special scenario refers to situations such as external vibration or the whole machine in motion. In this example, the second resistance is constant and cannot be easily adjusted. A resistance value of the second damper piece 334 can be adjusted separately after the entire device is disassembled, but an adjustment device is not provided after the lighting device 300 is assembled.

The second damper piece 334 includes a second fixed member 3341 and a second driven member 3342. The second fixed member 3341 and the second driven member 3342 can move relative to each other, and an elastic piece 3343 provides the second resistance for the relative movement. The second fixed member 3341 and the second driven member 3342 are connected to the sleeve 311 and the pivot 321, respectively, thereby converting the second resistance into a resistance between the sleeve 311 and the pivot 321 and then into the resistance between the first auxiliary panel 320 and the main panel 310. Specifically, the second fixed member 3341 is connected to the first sleeve 311*a*, and the second driven member 3342 is connected to the pivot 321. In this example, the second fixed member 3341 is provided with a connecting hole, and the first sleeve 311 is also provided with a connecting hole at a corresponding position. A fastener passes through the connecting holes of the second fixed member 3341 and the first sleeve 311 and connects the second fixed member 3341 to the first sleeve 311. In other examples, the second fixed member 3341 may be detachably connected to the first sleeve 311, which is not limited herein. To enhance the stability of the connection, an intermediate member 335 is further provided between the second driven member 3342 and the pivot 321. In this example, the second driven member 3342 is provided with a connecting hole, and the intermediate member 335 is also provided with a connecting hole at a corresponding position. A fastener passes through the connecting holes of the second driven member 3342 and the intermediate member 335 and connects the second driven member 3342 to the intermediate member 335. In other examples, the second driven member 3342 may be detachably connected to the intermediate member 335, which is not limited herein. Further, a through hole 3344 is formed in a middle of the second driven member 3342. The second damper piece 334 further includes a sleeve 3346, and the second fixed member 3341 and the second driven member 3342 are sleeved on the sleeve 3346 and rotate relative to the sleeve 3346. The sleeve 3346 is further provided with multiple fixing rings, and one of the multiple fixing rings is disposed between the second fixed member 3341 and the second driven member 3342 so that an interval exists between the second fixed member 3341 and the second driven member 3342. One of the multiple fixing rings is disposed at one end of the sleeve 3346, and the elastic piece 3343 is disposed between a resistance piece and the fixing ring.

The intermediate member 335 and the pivot 321 are connected and, in particular, detachably connected. The pivot 321 is provided with multiple connecting ribs 3212, and the connecting ribs 3212 are protrusions formed on an inner wall of the pivot 321. Correspondingly, multiple connecting grooves 3351 corresponding to the connecting ribs 3212 in shape are provided on the intermediate member 335. When the intermediate member 355 is connected to the pivot 321, the connecting grooves 3351 are sleeved on the connecting ribs 3212. At least two or three connecting ribs 3212 are provided. In this example, five connecting ribs 3212 are provided and evenly distributed on the inner wall of the pivot 321. Further, a through hole 3352 is formed in a middle of the intermediate member 335, the through hole 3352 corresponds to the through hole 3344 in position, and a channel formed by the through holes 3352 and 3344 is used for a cable 338 in the lighting device 300 to pass through. In this example, since the cable extends from a middle of the pivot 321 to a peripheral side of the first auxiliary panel 320, the through hole 3352 further has an upward opening, making the through hole 3352 closer to a groove in shape. Specifically, the second driven member 3342 may further be provided with notches 3345, where the notches 3345 have the same shape as the connecting ribs 3212 and are connected to the connecting ribs 3212 so that the second driven member 3342 and the pivot 321 are connected more stably.

In this example, a biasing member 336 is further provided between the intermediate member 335 and the pivot 321 and configured to assist in the assembly of the second damper piece 334 and the intermediate member 335. Specifically, one end of the biasing member 336 abuts against the intermediate member 335, and the other end of the biasing member 336 abuts against the inner wall of the pivot 321. The biasing member 336 provides the second damper piece 334 a force that makes the second damper piece 334 move toward the first sleeve 311*a* so that it is ensured that when the second damper piece 334 is installed in the pivot 321, the second fixed member 3341 is close to the first sleeve 311*a* and is convenient for connection. In this example, a partition is provided between the first cavity 3211 and the second cavity 3212, and one end of the biasing member 336 abuts against the partition.

A first end of the first sleeve 311*a* is connected to the second damper piece 334, and a second end of the first sleeve 311*a* is provided with an end cover 337 for closing the first sleeve 311*a*. The end cover 337 is formed with an accommodation cavity 3371, and the accommodation cavity 3371 at least partially extends into a hollow part of the first sleeve 311*a*. The accommodation cavity 3371 is provided with a terminal 3372. The cable 338 is segmented. One section of the cable 338 extends in the pivot 321 and is connected to a first end of the terminal 3372. Another section of the cable 338 is connected to a second end of the terminal 3372, enters the first sleeve 311*a* from the accommodation cavity 3371, and finally is connected to the circuit board in the base through the main panel 310.

The main panel 310 is further connected to or formed with a second handle 340 which may particularly be used for transporting the lighting device 300 in a folded state. The second handle 340 may rotate relative to the main panel 310. The second handle 340 includes two connecting arms 341 and a grip connected to the connecting arms 341. The connecting arm 341 is in a shape of a sleeve. A first connecting arm of the two connecting arms 341 is provided between the adjustment member 331 and the second sleeve 311*b*. Moreover, the adjustment member 331 can also lock the rotation of the second handle 340. A second connecting arm of the two connecting arms 341 is provided between the end cover 337 and the first sleeve 311*a*.

The above illustrates and describes basic principles, main features, and advantages of the present disclosure. It is to be understood by those skilled in the art that the preceding examples do not limit the present disclosure in any form, and technical solutions obtained through equivalent substitutions or equivalent transformations fall within the scope of the present disclosure.

What is claimed is:

1. A lighting device, comprising:

a base;

a panel assembly at least partially connected to the base and comprising a luminous body; and a power supply assembly configured to power the panel assembly and comprising a battery pack;

wherein the panel assembly comprises a main panel and at least two auxiliary panels, the lighting device has an unfolded state and a folded state, the main panel is mounted to the base and is non-detachable, the battery pack is at least partially disposed outside a housing of the lighting device, and when the lighting device is in the folded state, the panel assembly surrounds the battery pack outside the housing to protect the battery pack.

2. The lighting device of claim 1, further comprising a first handle and a second handle, wherein the first handle is at least partially connected to the at least two auxiliary panels and the second handle is at least partially connected to the main panel.

3. The lighting device of claim 1, further comprising a first handle and a second handle, wherein the first handle is operable so as to transport the lighting device when the lighting device is in the unfolded state, and the second handle is operable so as to transport the lighting device when the lighting device is in the folded state.

4. The lighting device of claim 1, wherein a luminous flux of light emitted by the panel assembly at a maximum power is greater than or equal to 6000 lm and less than or equal to 20000 lm.

5. The lighting device of claim 1, wherein, when only local lighting is required in an operation environment, the lighting device is configured to be operated to control one panel in the panel assembly to light up.

6. The lighting device of claim 1, wherein the power supply assembly is configured to be inserted into or detached from the main panel along an up-and-down direction.

7. The lighting device of claim 1, wherein the main panel comprises a front side which emits light forward and a rear side which is opposite to the front side, and the battery pack is arranged on the rear side of the main panel.

8. The lighting device of claim 7, wherein the battery pack is connected to a casing on a back side of the main panel.

9. The lighting device of claim 1, wherein the base extends substantially along a first plane, and the main panel extends substantially along a second plane, and the first plane is perpendicular to the second plane.

10. The lighting device of claim 9, wherein the at least two auxiliary panels comprises a first auxiliary panel, a second auxiliary panel, and a third auxiliary panel.

11. The lighting device of claim 10, wherein the first auxiliary panel is rotatably connected to the main panel about a first axis, and the first axis is substantially parallel to the first plane and is substantially parallel to the second plane.

12. The lighting device of claim 11, wherein the second auxiliary panel is rotatably connected to the first auxiliary panel about a second axis, the second axis is substantially perpendicular to the first axis, the third auxiliary panel is rotatably connected to the first auxiliary panel about a third axis, and the third axis is substantially perpendicular to the first axis and is substantially parallel to the second axis.

13. The lighting device of claim 1, wherein the at least two auxiliary panels comprises a first auxiliary panel, and the battery pack is disposed at a rear side of the main panel when the first auxiliary panel is operated to rotate to a front side of the main panel.

14. The lighting device of claim 1, wherein the panel assembly is provided with a U-shaped area when the lighting device is in the folded state, and the battery pack is arranged at least partially in the U-shaped area.

15. The lighting device of claim 1, further comprises a hook assembly disposed on a lower side of the base of the lighting device.

16. The lighting device of claim 15, wherein the hook assembly is rotatably connected to the base and capable of rotating to a storage position and a hanging position.

17. A lighting device, comprising:

a base;

a panel assembly at least partially connected to the base and comprising a luminous body; and a power supply assembly configured to power the panel assembly and comprising a battery pack;

wherein the panel assembly comprises a main panel, and at least two auxiliary panels, the lighting device has an unfolded state and a folded state, the main panel is non-removably mounted to the base, the battery pack is at least partially disposed outside a housing of the lighting device, the panel assembly is provided with a U-shaped area when the lighting device is in the folded state, and the battery pack is arranged at least partially in the U-shaped area so that the battery pack outside of the housing is protected by the panel assembly through the U-shaped area.

18. The lighting device of claim 17, wherein the main panel comprises a front side which emits light forward and a rear side which is opposite to the front side, and the battery pack is arranged on the rear side of the main panel.

19. The lighting device of claim 17, further comprising a first handle and a second handle, wherein the first handle is at least partially connected to the at least two auxiliary panels and the second handle is at least partially connected to the main panel.

20. The lighting device of claim 17, further comprising a first handle and a second handle, wherein the first handle is operable so as to transport the lighting device when the lighting device is in the unfolded state, and the second handle is operable so as to transport the lighting device when the lighting device is in the folded state.

* * * * *